United States Patent
Bhadriraju et al.

(10) Patent No.: US 11,929,981 B2
(45) Date of Patent: Mar. 12, 2024

(54) BATCH ASSIGNMENT OF IP ADDRESSES IN A BUILDING CONTROL NETWORK

(71) Applicant: Honeywell International Inc., Charlotte, NC (US)

(72) Inventors: Lavanya Bhadriraju, Bangalore (IN); Ravi Bharathi Krishnan, Bengaluru (IN); John Hutchey, North Las Vegas, NV (US); Shyamsundhar Madhusudhan, Chennai (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 17/476,058

(22) Filed: Sep. 15, 2021

(65) Prior Publication Data

US 2023/0082348 A1 Mar. 16, 2023

(51) Int. Cl.
*H04L 61/5007* (2022.01)
*H04L 41/08* (2022.01)
(Continued)

(52) U.S. Cl.
CPC ...... *H04L 61/5007* (2022.05); *H04L 41/0803* (2013.01); *H04L 41/0866* (2013.01);
(Continued)

(58) Field of Classification Search
CPC ............ H04L 41/0803; H04L 41/0806; H04L 41/0813; H04L 41/0866; H04L 41/0873;
(Continued)

(56) References Cited

U.S. PATENT DOCUMENTS 7,103,648 B1 * 9/2006 Burrows ............. H04L 61/2015
709/229
7,356,011 B1 * 4/2008 Waters .................... H04L 41/08
380/258

(Continued)

FOREIGN PATENT DOCUMENTS

AU 2011235937 B2 12/2013
CA 2703206 C 3/2014
(Continued)

OTHER PUBLICATIONS

AXIS Communications. Security Control with AXIS Device Manager, 2019. (Year: 2019).*
(Continued)

*Primary Examiner* — Vivek Srivastava
*Assistant Examiner* — William C McBeth
(74) *Attorney, Agent, or Firm* — Seager, Tufte & Wickhem, LLP

(57) ABSTRACT

A method of assigning IP addresses to devices of a building control network includes receiving a selection of selected devices of a plurality of devices from a user interface. The selected devices are displayed in a predetermined order on a display. A proposed static IP address for a first device in the predetermined order of the selected devices is received from the user interface. A static IP address is sequentially assigned to each of the selected devices following the first device in accordance with the predetermined order, assuming the subnet mask has been confirmed as valid. The selected devices in the predetermined order along with the assigned static IP addresses for each of the selected devices are displayed on the display. The assigned static IP address for each of the selected devices are downloaded to the corresponding one of the selected devices.

19 Claims, 26 Drawing Sheets

(51) Int. Cl.
*H04L 41/0803* (2022.01)
*H04L 41/0866* (2022.01)
*H04L 61/5038* (2022.01)
*H04L 101/695* (2022.01)

(52) U.S. Cl.
CPC ...... *H04L 41/0879* (2013.01); *H04L 41/0889* (2013.01); *H04L 61/5038* (2022.05); *H04L 2101/695* (2022.05)

(58) Field of Classification Search
CPC ............. H04L 41/0876; H04L 41/0879; H04L 41/0883; H04L 41/0889; H04L 41/22; H04L 61/2007; H04L 61/2015; H04L 61/203; H04L 61/2038; H04L 61/2046; H04L 61/2061; H04L 12/2803; H04L 12/2807; H04L 41/08; H04L 61/50; H04L 61/5007; H04L 61/5038; H04L 61/5046; H04L 61/5061; H04L 2101/695; H04L 41/082; H04L 41/12
See application file for complete search history.

(56) References Cited

U.S. PATENT DOCUMENTS

| | | | | |
|---|---|---|---|---|
| 7,634,555 | B1* | 12/2009 | Wainscott, Jr. | H04L 67/125 700/19 |
| 7,730,223 | B1* | 6/2010 | Bavor | H04L 67/36 710/15 |
| 9,009,585 | B1* | 4/2015 | Chetrit | G06F 9/453 715/221 |
| 10,402,358 | B2 | 9/2019 | Sorenson et al. | |
| 2002/0049693 | A1* | 4/2002 | Gase | H04L 41/0866 |
| 2002/0161867 | A1* | 10/2002 | Cochran | H04L 61/50 709/224 |
| 2004/0133689 | A1* | 7/2004 | Vasisht | H04L 41/0803 709/228 |
| 2005/0149753 | A1* | 7/2005 | Cromer | H04L 61/5046 726/4 |
| 2005/0216580 | A1* | 9/2005 | Raji | H04L 41/0886 709/223 |
| 2006/0242272 | A1* | 10/2006 | Furukawa | H04L 41/0869 709/220 |
| 2007/0097992 | A1* | 5/2007 | Singh | H04L 61/5046 370/395.54 |
| 2009/0164668 | A1* | 6/2009 | Duckett | H04L 61/5007 710/9 |
| 2012/0131197 | A1* | 5/2012 | Prentice | H04L 61/2046 709/226 |
| 2015/0188775 | A1* | 7/2015 | Van Der Walt | H04L 41/22 715/734 |
| 2016/0099832 | A1* | 4/2016 | Alshinnawi | H04L 41/0886 709/221 |
| 2016/0224208 | A1* | 8/2016 | Bugajski | H04L 41/22 |
| 2017/0019979 | A1* | 1/2017 | Ghanoun | H05B 47/29 |
| 2017/0195162 | A1* | 7/2017 | Enrique Salpico | H04L 67/02 |
| 2017/0237608 | A1* | 8/2017 | Wu | H04L 41/0803 709/220 |
| 2018/0034923 | A1* | 2/2018 | Mendonca | H04L 41/12 |
| 2018/0337822 | A1* | 11/2018 | Heimes | H04L 41/0806 |
| 2018/0375823 | A1* | 12/2018 | Nalukurthy | H04L 61/5046 |
| 2019/0058627 | A1* | 2/2019 | Collins | H04L 41/082 |
| 2020/0019287 | A1* | 1/2020 | Sahai | H04L 61/5092 |
| 2020/0162503 | A1* | 5/2020 | Shurtleff | H04L 41/0883 |
| 2021/0176123 | A1* | 6/2021 | Plamondon | H04L 41/0843 |
| 2021/0373929 | A1* | 12/2021 | He | H04L 41/0806 |
| 2023/0010215 | A1* | 1/2023 | Bliss | H04L 41/0806 |

FOREIGN PATENT DOCUMENTS

| | | |
|---|---|---|
| CN | 113131588 A | 7/2021 |
| EP | 1584158 B1 | 4/2012 |
| GB | 2397202 A | 7/2004 |
| WO | 2008144804 A1 | 12/2008 |

OTHER PUBLICATIONS

Bernard, Ray,P.S.P., C.H.S.-1.,11. (Feb. 2018). How to manage high-camera-count deployments. Security Technology Executive, 28, 8-9. Retrieved from https://dialog.proquest.com/professional/docview/2015779864?accountid=131444 (Year: 2018).*

Axis communications unveils new device manager. (2018). Wireless News, , NA. Retrieved from https://dialog.proquest.com/professional/docview/2002150801?accountid=131444 (Year: 2018).*

Wang, Mingyu, and Dong Yang. "IPv6 Address Assignment and Management Mechanism for Heterogeneous Industrial Networks." 2021 IEEE 5th Advanced Information Technology, Electronic and Automation Control Conference (IAEAC). vol. 5. IEEE, 2021. (Year: 2021).*

AXIS Device Manager—Configuration Tip Video Screen Shots (Video Dated Feb. 1, 2018), "Configuration tip: AXIS Device Manager—Assign IP", YouTube, uploaded by Axis Technical Support Videos, Feb. 1, 2018, https://www.youtube.com/watch?v=gt7GaO9HN8s.

AXIS Communications, "How to Assign an IP Address and Access your Device, " Reference/User Manual, 2020, 10 pages.

ProVisionaire Amp Editor Setup Guide (downloaded Sep. 15, 2021).

* cited by examiner

| Database | | | | | | |
|---|---|---|---|---|---|---|
| Name | Device ID | Status | Model | Firmware Rev | Irm Family | Irm Program Name |
| CPO-VA75IBWA24NM | device:1004 | {ok} | VA75IBWA24NM | 0.0.0.68 | IrmControl 2.0.0.0 | IRM Program |
| CPO-VA75IBWA24NM1 | device:-1 | {fault,stale} | VA75IBWA24NM | 0.0.0.68 | IrmControl 2.0.0.0 | IRM Program |
| CPO-VA75IBWA24NM2 | device:-1 | {fault,stale} | VA75IBWA24NM | 0.0.0.68 | IrmControl 2.0.0.0 | IRM Program |
| CPO-VA75IBWA24NM3 | device:-1 | {fault,stale} | VA75IBWA24NM | 0.0.0.68 | IrmControl 2.0.0.0 | IRM Program |
| CPO-VA75IBWA24NM4 | device:-1 | {fault,stale} | VA75IBWA24NM | 0.0.0.68 | IrmControl 2.0.0.0 | IRM Program |

| Discover | Add | Match | TSynch | Mac Config | IP Config | BLE Config | Swap Out | Swap In |

FIG. 13

| Device Name | Model Name | Device ID | Status | IP Address | IP Address | Network Time Server |
|---|---|---|---|---|---|---|
| CPO-VA75IBWA24NM | VA75IBWA24NM1 | device:1004 | Online | Static | 199.63.126.31 | |
| CPO-VA75IBWA24NM1 | VA75IBWA24NM1 | device:1010 | Offline | Static | 199.63.126.32 | |
| CPO-VA75IBWA24NM2 | VA75IBWA24NM2 | device:1011 | Offline | Static | 199.63.126.33 | |
| CPO-VA75IBWA24NM3 | VA75IBWA24NM3 | device:1012 | Offline | Static | 199.63.126.34 | |
| CPO-VA75IBWA24NM4 | VA75IBWA24NM4 | device:1013 | Offline | Static | 199.63.126.35 | |

350

| Device Name | Field Name | Error Details |
|---|---|---|
| CPO-VA75IBWA24NM1 | IP Address, Default Gateway, SUbnet Mask | The Default gateway is not on the sam |
| CPO-VA75IBWA24NM1 | Subnet Mask | Invalid subnet mask, The subnet mask |
| CPO-VA75IBWA24NM1 | IP Address | First octet of IP Address should be bet |
| CPO-VA75IBWA24NM2 | IP Address | Address should be in proper format an |

| Device Name | Model Name | Device ID | Status | IP Address | IP Address | Network Time Server |
|---|---|---|---|---|---|---|
| CPO-VA75IBWA24NM | VA75IBWA24NM | device:1004 | Online | Static | 199.63.126.124 | |
| CPO-VA75IBWA24NM1 | VA75IBWA24NM | device:1010 | Offline | Static | 199.63.126.126 | |
| CPO-VA75IBWA24NM2 | VA75IBWA24NM | device:1011 | Offline | Static | 199.63.126.126 | |
| CPO-VA75IBWA24NM3 | VA75IBWA24NM | device:1012 | Offline | Static | 199.63.126.34 | |
| CPO-VA75IBWA24NM4 | VA75IBWA24NM | device:1013 | Offline | Static | 199.63.126.35 | |

370

| Device Name | Device ID | MAC Address |
|---|---|---|
| CPO-VA75IBWA24NM | device:1004 | 199.63.126.124.0.BAC.0 |

| Device Name | Field Name | Error Details |
|---|---|---|
| CPO-VA75IBWA24NM1 | IP Address | Duplicate IP Address found for CPO-VA75IBWA24NM1 with networ |
| CPO-VA75IBWA24NM3 | IP Address | Duplicate IP Address found for Device CPO-VA75IBWA24NM1 with |

| Status | Timestamp | Message | Details |
|---|---|---|---|
| Message | 01-Sep-21 7:24 PM IST | IRM batch operation started | |
| Message | 01-Sep-21 7:24 PM IST | Update IP configuration operation started for device | |
| Message | 01-Sep-21 7:24 PM IST | IP Settings have been updated to device level comp | |
| Message | 01-Sep-21 7:24 PM IST | Update IP configuration operation is ended for devic | |
| Success | 01-Sep-21 7:24 PM IST | IRM batch operation ended! | |
| Success | 01-Sep-21 7:24 PM IST | Job Success | |

FIG. 24

| Status | Timestamp | Message | Details |
|---|---|---|---|
| Message | 01-Sep-21 7:24 PM IST | IRM batch operation started | |
| Message | 01-Sep-21 7:24 PM IST | Update IP configuration operation started for device | |
| Message | 01-Sep-21 7:24 PM IST | Update IP configuration operation started for device | |
| Message | 01-Sep-21 7:24 PM IST | IP Settings have been updated to device level comp | |
| Message | 01-Sep-21 7:24 PM IST | IP Settings have been updated to device level comp | |
| Failed | 01-Sep-21 7:24 PM IST | Failed to communicate with the Controller! | |
| Failed | 01-Sep-21 7:24 PM IST | Please try again | |
| Message | 01-Sep-21 7:24 PM IST | Update IP configuration operation is ended for devic | |
| Failed | 01-Sep-21 7:24 PM IST | Job Failed | |

FIG. 25

450 — Service Pin Rank

Online device present in the BACnet Network with Device ID 1004. The same has been added to database for further configuration Discovered

| Device Name | Device ID | MAC Addr | Vendor | Model |
|---|---|---|---|---|
| CPO-VA75iBWA24NM | device:1004 | 199.63.126.120.0xBAC | Honeywell Int. | VA75iBWA24NM |

452

Database

| Name | Device ID | Status | Model | Firmware Rev | Irm Family | Irm Program Name |
|---|---|---|---|---|---|---|
| CPO-VA75iBWA24NM | device:1004 | ok | VA75iBWA24NM | 0.0.0.68 | IrmControl 2.0.0.0 | IRM Program |
| CPO-VA75iBWA24NM1 | device:-1 | (fault,stale) | VA75iBWA24NM | 0.0.0.68 | IrmControl 2.0.0.0 | IRM Program |
| CPO-VA75iBWA24NM2 | device:-1 | (fault,stale) | VA75iBWA24NM | 0.0.0.68 | IrmControl 2.0.0.0 | IRM Program |
| CPO-VA75iBWA24NM3 | device:-1 | (fault,stale) | VA75iBWA24NM | 0.0.0.68 | IrmControl 2.0.0.0 | IRM Program |
| CPO-VA75iBWA24NM4 | device:-1 | (fault,stale) | VA75iBWA24NM | 0.0.0.68 | IrmControl 2.0.0.0 | IRM Program |

454

456

These are offline devices added by the user based on the site configuration data. The availability of this feature will drastically reduce the time a user needs to spend in a site as all the configuration including the IP Configuration can be completed away from the site & once in the site, the use just needs to commision the devices as per the configurations

| Discover | Add | Match | TSynch | Mac Config | IP Config | BLE Config | Swap Out | Swap In |

FIG. 26

BATCH ASSIGNMENT OF IP ADDRESSES IN A BUILDING CONTROL NETWORK

TECHNICAL FIELD

The present disclosure pertains generally to building control networks and more particularly to efficiently assigning IP addresses to devices in a building control network.

BACKGROUND

Building control networks include a number of assets including building controllers and a variety of different building system devices that are controlled by those building controllers. These devices are often connectable to a network in order to allow the devices to easily communicate with each other. Each device has a unique address, such as an IP address, that allows other devices to find and communicate with that device. Because building control networks can include hundreds or even thousands of devices, it will be appreciated that the process of manually assigning unique IP addresses to each of the devices can be a tedious, time-consuming and error prone. A need remains for improved systems and methods for efficiently and accurately assigning unique addresses, such as IP addresses in an IP network, to a large number of building control network devices, sometimes even before at least some of the building control network devices are even connected to the network and placed online.

SUMMARY

This disclosure relates generally to building control networks and more particularly to efficiently assigning IP addresses to devices in a building control network. An example may be found in a method of assigning IP addresses to devices of a building control network. In one example, a selection of selected devices of a plurality of devices is received from a user interface. The selected devices are displayed in a predetermined order on a display. In some cases, the predetermined order can be dictated by a user by filtering and/or sorting the devices according to selected filtering and/or sorting criteria. A proposed static IP address for a first device in the predetermined order of the selected devices is received from the user interface. A static IP address is then sequentially assigned to each of the selected devices following the first device in accordance with the predetermined order, assuming the subnet mask has been confirmed as valid. The selected devices in the predetermined order along with the assigned static IP addresses for each of the selected devices are displayed on the display. The assigned static IP address for each of the selected devices may then be downloaded to the corresponding one of the selected devices.

Another example may be found in a system for assigning static IP addresses to a plurality of devices. The system includes a computing device that is configured to communicate over a LAN with the plurality of devices. The computing device includes a controller and is operatively coupled to a user interface including a display. The controller is configured to receive from the user interface a selection of selected devices of the plurality of devices and to display the selected devices in a predetermined order on the display. In some cases, the predetermined order can be dictated by a user by filtering and/or sorting the devices according to selected filtering and/or sorting criteria. The controller is configured to receive from the user interface a proposed static IP address for a first device in the predetermined order of the selected devices and to sequentially assign a static IP address to each of the selected devices following the first device in accordance with the predetermined order. The controller is configured to display on the display the selected devices in the predetermined order along with the assigned static IP addresses for each of the selected devices, and to download the assigned static IP address for each of the selected devices to the corresponding one of the selected devices over the LAN.

Another example may be found in a non-transitory, computer-readable storage medium that has instructions stored thereon. When the instructions are executed by one or more processors, the one or more processors are caused to receive from a user interface a selection of selected devices of a plurality of devices and to display the selected devices in a predetermined order on a display. In some cases, the predetermined order can be dictated by a user by filtering and/or sorting the devices according to selected filtering and/or sorting criteria. The one or more processors are caused to receive from the user interface a proposed static IP address for a first device in the predetermined order of the selected devices and to sequentially assign a static IP address to each of the selected devices following the first device in accordance with the predetermined order. The one or more processors are caused to display on the display the selected devices in the predetermined order along with the assigned static IP addresses for each of the selected devices, and to download the assigned static IP address for each of the selected devices to the corresponding one of the selected devices.

The preceding summary is provided to facilitate an understanding of some of the features of the present disclosure and is not intended to be a full description. A full appreciation of the disclosure can be gained by taking the entire specification, claims, drawings, and abstract as a whole.

BRIEF DESCRIPTION OF THE DRAWINGS

The disclosure may be more completely understood in consideration of the following description of various illustrative embodiments of the disclosure in connection with the accompanying drawings, in which:

FIGS. 13 through 26 are screen shots illustrating features of the flow diagram of FIG. 10.

Figure 1:
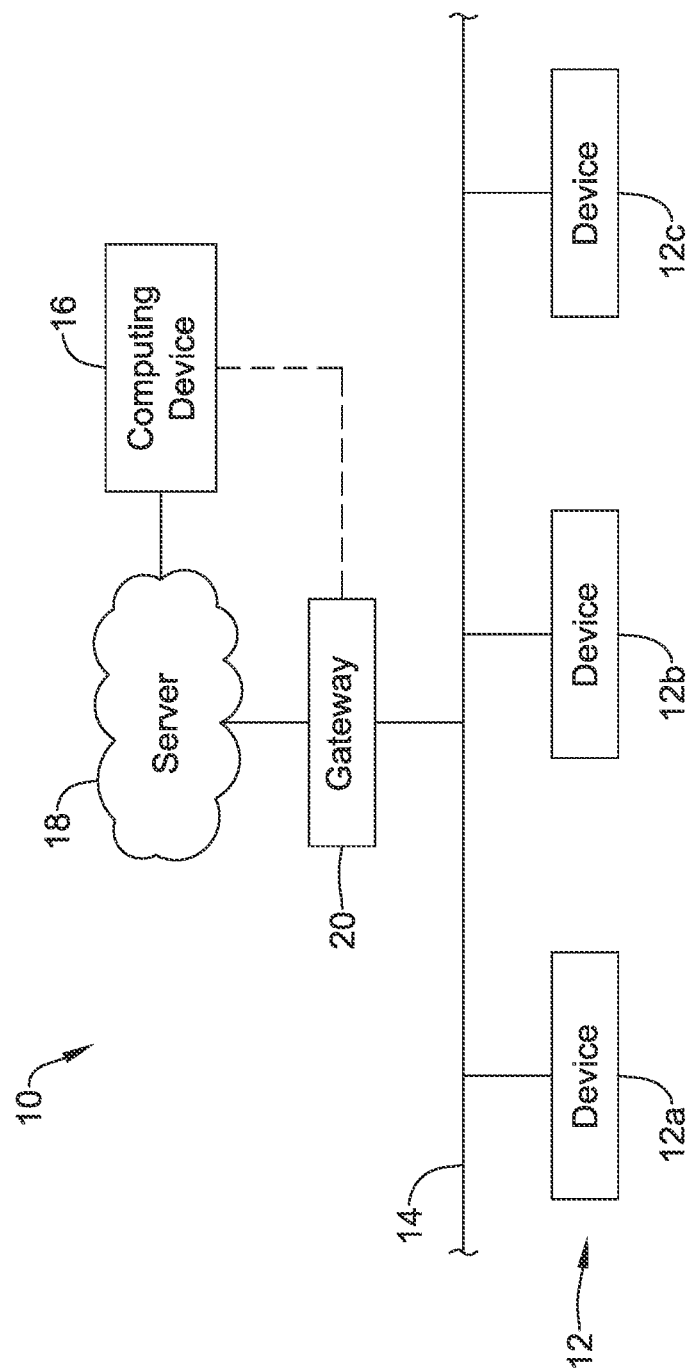
FIG. 1 is a schematic block diagram of an illustrative building control network.

While the disclosure is amenable to various modifications and alternative forms, specifics thereof have been shown by way of example in the drawings and will be described in detail. It should be understood, however, that the intention is not to limit aspects of the disclosure to the particular illustrative embodiments described. On the contrary, the intention is to cover all modifications, equivalents, and alternatives falling within the spirit and scope of the disclosure.

DESCRIPTION

The following description should be read with reference to the drawings wherein like reference numerals indicate like elements. The drawings, which are not necessarily to scale, are not intended to limit the scope of the disclosure. In some of the figures, elements not believed necessary to an understanding of relationships among illustrated components may have been omitted for clarity.

All numbers are herein assumed to be modified by the term "about", unless the content clearly dictates otherwise. The recitation of numerical ranges by endpoints includes all numbers subsumed within that range (e.g., 1 to 5 includes 1, 1.5, 2, 2.75, 3, 3.80, 4, and 5).

As used in this specification and the appended claims, the singular forms "a", "an", and "the" include the plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is contemplated that the feature, structure, or characteristic may be applied to other embodiments whether or not explicitly described unless clearly stated to the contrary.

FIG. 1 is a schematic block diagram of an illustrative building control network 10. The illustrative building control network 10 includes a plurality of building control network devices 12, individually labeled as 12a, 12b, 12c. While a total of three devices 12 are shown, it will be appreciated that this is merely illustrative, as the building control network 10 may include any number of devices 12 and likely will include a substantially greater number of devices 12. At least some of the devices 12 may be controllers, for example. At least some of the devices 12 may be actuators. At least some of the devices 12 may be sensors. Any number of different types of devices 12 are contemplated.

In the example shown, the devices 12 are operably coupled with a network 14. In some instances, the network 14 represents a local area network (LAN) that allows communication between devices 12 that are coupled with the network 14. The network 14 may also represent any of a variety of different types of networks, including wide area networks (WAN), up to and including the Internet. In some cases, the network 14 may be an IP network.

The illustrative building control network 10 includes a computing device 16. The computing device 16, as will be discussed, may be used to automatically assign IP addresses to each of the devices 12. The computing device 16 may be a laptop or desktop computer, for example. The computing device 16 may include distributed computing that is distributed between two or more network-connected devices. The computing device 16 itself may be manifested within a cloud-based server. In some instances, the computing device 16 may communicate with a cloud-based server 18, which itself is operably coupled with a gateway 20 that allows the devices 12 along the network 14 to communicate beyond the network 14. In some instances, the computing device 16 may communicate directly with the gateway 20, rather than communicating through the cloud-based server 18 as an intermediary. In some cases, the computing device 16 may be manifested within the cloud-based server 18. In some cases, the computing device 16 may be connected to and communicate directly on the network 14, without an intervening gateway 20.

Figure 2:
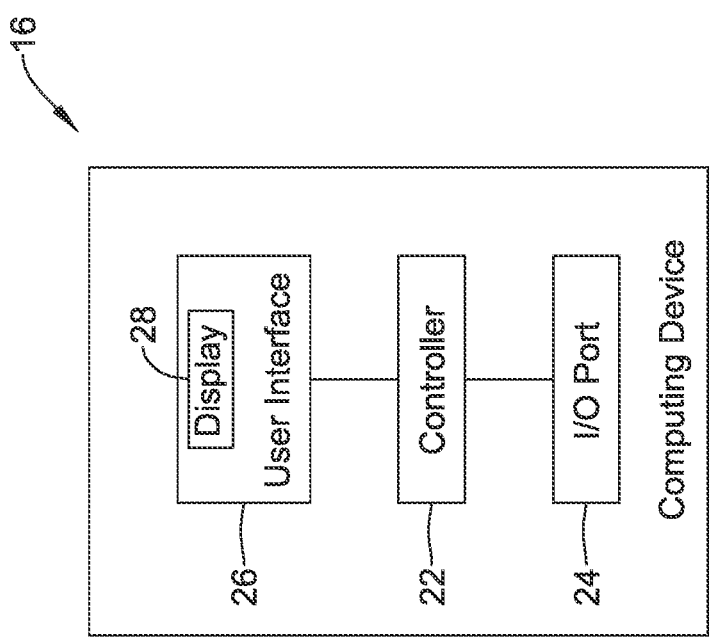
FIG. 2 is a schematic block diagram of an illustrative computing device.

FIG. 2 is a schematic block diagram of the illustrative computing device 16. The illustrative computing device 16 includes a controller 22 that is configured to carry out the functionality of the computing device 16. In some instances, the controller 22 may include one or more processors that are configured to execute software that allows the controller 22 to automatically assign static IP addresses to each of a plurality of devices (such as the devices 12) once a user has indicated a particular static IP address for a first device of the plurality of devices. In some cases, the controller 22 is operably coupled with an I/O port 24 that enables the computing device 16 to communicate with other devices, such as but not limited to the devices 12, the cloud-based server 18 and the gateway 20. These are just examples.

In the example shown, the controller 22 is also operably coupled with a user interface 26. The user interface 26 may be considered as providing an HMI (human machine interface) that allows a user to view information displayed by the user interface 26. The user interface 26 may also allow a user to make entries, selections, and/or enter other information. The user interface 26 includes a display 28. The display 28 may be a display monitor such as an LCD display or an LED display. The display may be a touch screen display. The user interface 26 may include a keyboard and mouse, for example, or perhaps a touch pad. The user interface 26 may be formed as part of the computing device 16. In some cases, the user interface 26 may be separate from the computing device 16 but operably coupled with the computing device 16 via a wireless network or appropriate cables, for example. The computing device 16 may include USB ports, for example, to which peripherals such as a keyboard and a mouse may be connected. The computing device 16 may include video ports such as but not limited to an HDMI port, a VGA port, an S-video port, a Display Port, a Thunderbolt port or a DVI port. In some cases, the user interface 26 may be provided by a mobile device such as a smart phone, tablet or other device that is in communication with the computing device 16. These are just examples.

The controller 22 of the computing device 16 may be configured to receive from the user interface 26 a selection of selected devices of the plurality of devices 12 and to display the selected devices in a predetermined order on the display 28. In some cases, the predetermined order can be dictated by a user by filtering and/or sorting the devices according to selected filtering and/or sorting criteria. The controller 22 may be configured to receive from the user interface 26 a proposed static IP address for a first device in the predetermined order of the selected devices 12 and to sequentially assign a static IP address to each of the selected devices 12 following the first device 12 in accordance with the predetermined order. The controller 22 may be configured to display on the display 28 the selected devices 12 in the predetermined order along with the assigned static IP addresses for each of the selected devices 12.

The controller 22 may be configured to download the assigned static IP address for each of the selected devices 12 to the corresponding one of the selected devices over a LAN, such as network 14. In some cases, at least some of the selected devices 12 may be offline, and the controller 22 may be configured to download the assigned static IP address to the corresponding selected device 12 after the corresponding selected device 12 is placed online. For example, in some cases, the building control network may be designed at a remote design center well before the building control network is installed and configured on-site. The controller 22 may be used to assign static IP address to each of devices 12 during the design phase and before the building control network is installed and configured on-site. Once the building control network is installed, and each of the devices 12 is placed on-line, the controller 22 may download the assigned static IP address to each of the devices 12.

In some instances, the controller 22 may be configured to apply one or more filters to the plurality of devices 12, wherein the one or more filters may remove one or more of the plurality of devices 12 that do not meet one or more filter criteria, resulting in the plurality of devices 12 from which the selection of selected devices 12 may be made. In some cases, the controller 22 may be configured to sort the selected devices 12 in accordance with one or more sorting criteria prior to receiving from the user interface 26 the proposed static IP address for the first device 12 of the selected devices 12. The sorting criteria, if used, may include sorting by one or more device parameters including, for example, one or more of a device name, a device type, a device ID, a device status, an IP address, a default gateway, a subnet mask, and network time server. In some cases, the controller 22 may be further configured to receive from the user interface 26 one or more sorting criteria, and once the one or more sorting criteria is received, sorting the selected devices 12 in accordance with the one or more received sorting criteria prior to receiving from the user interface 26 the proposed static IP address for the first device 12 of the selected devices 12. The sorting criteria may be used to dictate the predetermined order of the selected devices 12, and thus which of the devices 12 is listed as the first device of the selected devices.

Figure 3:
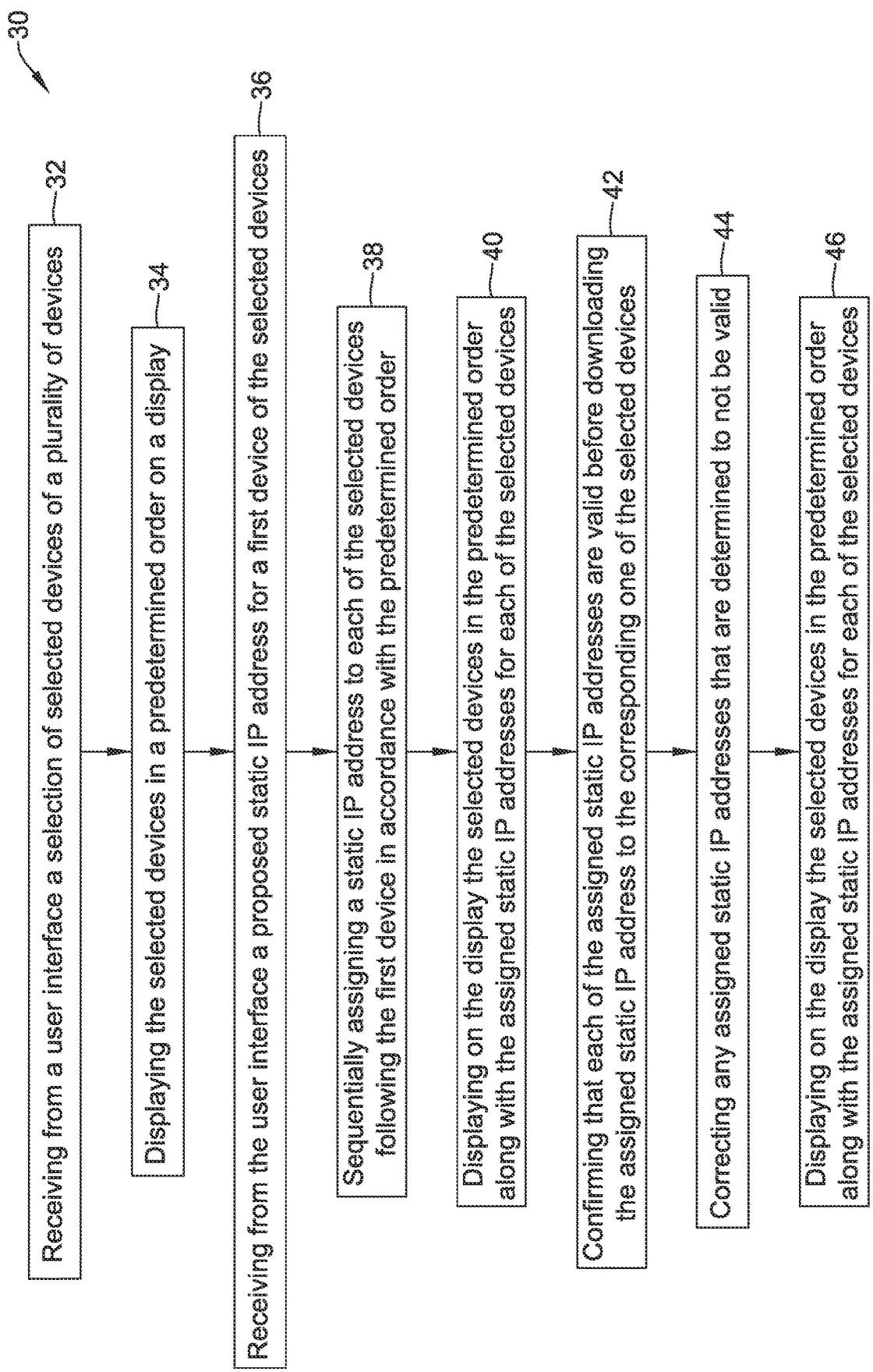
FIG. 3 is a flow diagram showing an illustrative method of assigning IP addresses to devices of a building control network such as the building control network of FIG. 1.
Figure 4:
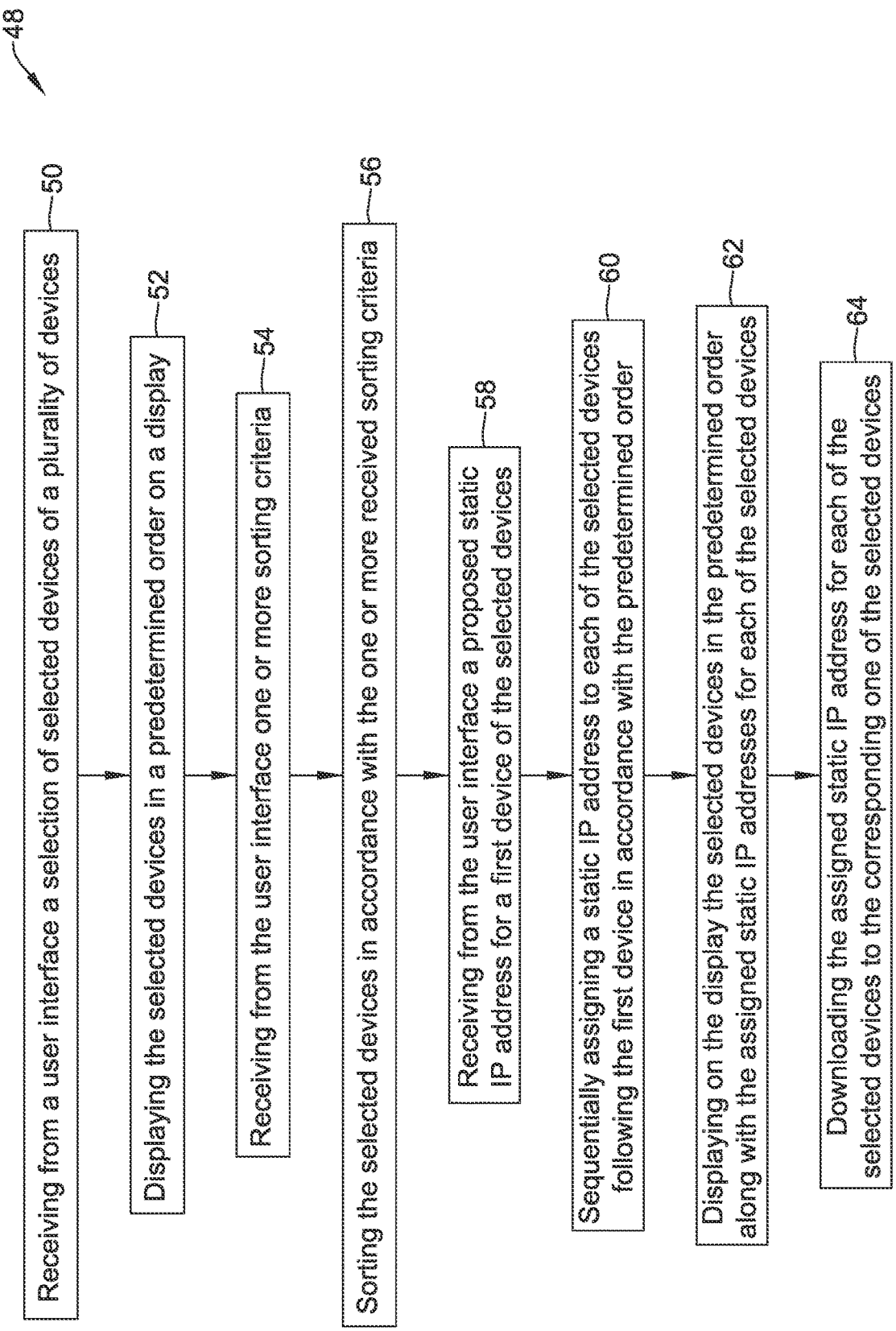
FIG. 4 is a flow diagram showing an illustrative method of assigning IP addresses to devices of a building control network such as the building control network of FIG. 1.
Figure 5:
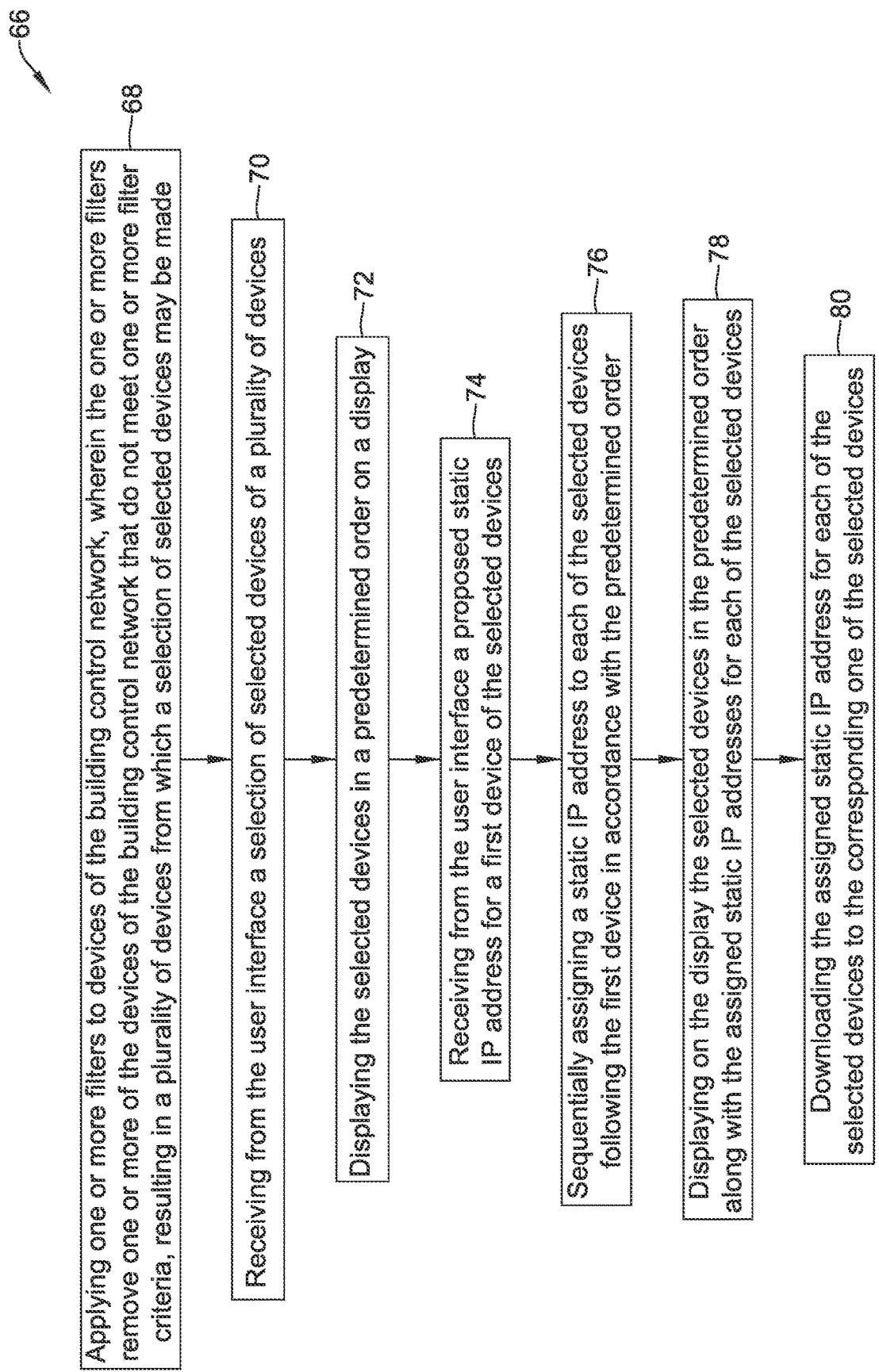
FIG. 5 is a flow diagram showing an illustrative method of assigning IP addresses to devices of a building control network such as the building control network of FIG. 1.

FIGS. 3, 4 and 5 are flow diagrams showing methods that may be carried out via the computing device 16. Each of the method steps that may be carried out by the computing device 16 may also be considered as method steps that the controller 22 (of the computing device 16) is configured to carry out.

FIG. 3 is a flow diagram showing an illustrative method 30 of assigning IP addresses to devices (such as the devices 12) of a building control network (such as the building control network 10). A selection of selected devices of a plurality of devices is received from a user interface (such as the user interface 26), as indicated at block 32. The selected devices are displayed in a predetermined order on a display (such as the display 28), as indicated at block 34. In some cases, the predetermined order can be dictated by a user by filtering and/or sorting the devices according to selected filtering and/or sorting criteria. A proposed static IP address for a first device in the predetermined order of the selected devices is received from the user interface, as indicated at block 36. In some cases, receiving from the user interface the proposed static IP address for the first device further comprises soliciting from a user via the user interface a Subnet mask and/or default gateway for the first device. A static IP address is sequentially assigned to each of the selected devices following the first device in accordance with the predetermined order, as indicated at block 38. In some cases, the same Subnet mask and default gateway are assigned to each of the selected devices. The selected devices are then displayed on the display in the predetermined order along with the assigned static IP addresses for each of the selected devices, as indicated at block 40.

In some cases, each of the assigned static IP addresses are confirmed as being valid before downloading the assigned static IP address to the corresponding one of the selected devices. Any of the assigned static IP addresses that are found not to be valid may be corrected, as indicated at block 44. In some cases, correcting the invalid static IP addresses may include soliciting a correction from a user via the user interface. In some cases, correcting the invalid static IP addresses may include discarding the assigned static IP address for a particular device when the assigned static IP address for that particular device is determined to be invalid.

The assigned static IP address for each of the selected devices are downloaded to the corresponding one of the selected devices, as indicated at block 46. At least some of the selected devices may have an offline status, meaning that the corresponding selected device is not connected to or otherwise available on the building control network. At least some of the selected devices may have an online status, meaning that the corresponding selected device is powered on and available on the building control network. For devices that are offline, downloading the assigned static IP address for each of the selected devices to the corresponding one of the selected devices may be done after the corresponding selected device is placed online.

In some cases, displaying on the display the selected devices in the predetermined order along with the assigned static IP addresses for each of the selected devices may include displaying an online/offline status for each of the selected devices. In some instances, displaying on the display the assigned static IP addresses for each of the selected devices may further include displaying a Subnet mask and a default gateway for each of the selected devices.

FIG. 4 is a flow diagram showing an illustrative method 48 of assigning IP addresses to devices (such as the devices 12) of a building control network (such as the building control network 10). A selection of selected devices of a plurality of devices is received from a user interface (such as the user interface 26), as indicated at block 50. The selected devices are displayed in a predetermined order on a display (such as the display 28), as indicated at block 52. In some cases, one or more sorting criteria are received form the user interface, as indicated at block 54. The selected devices may be sorted in accordance with one or more sorting criteria, as indicated at block 56. In some cases, the sorting criteria may include, for example, one or more device parameters such as but not limited to device name, a device type, a device ID, a device status, an IP address, a default gateway, a subnet mask, and network time server. The sorting criteria may dictate the predetermined order of the selected devices.

A proposed static IP address for a first device in the predetermined order of the selected devices is received from the user interface, as indicated at block 58. A static IP address is sequentially assigned to each of the selected devices following the first device in accordance with the predetermined order, as indicated at block 60. The selected devices are displayed on the display in the predetermined order along with the assigned static IP addresses for each of the selected devices, as indicated at block 62.

In some cases, each of the assigned static IP addresses are confirmed as being valid before downloading the assigned static IP address to the corresponding one of the selected devices. In some cases, correcting the invalid static IP addresses may include soliciting a correction from a user via the user interface. In some cases, correcting the invalid static IP addresses may include discarding the assigned static IP address for a particular device when the assigned static IP address for that particular device is determined to be invalid. The assigned static IP address for each of the selected devices are downloaded to the corresponding one of the selected devices, as indicated at block 64.

FIG. 5 is a flow diagram showing an illustrative method 66 of assigning IP addresses to devices (such as the devices 12) of a building control network (such as the building control network 10). One or more filters may be applied to devices of the building control network, wherein the one or more filters remove one or more of the devices of the building control network that do not meet one or more filter criteria, resulting in the plurality of devices from which the selection of selected devices is made, as indicated at block 68.

A selection of selected devices of a plurality of devices is received from a user interface (such as the user interface 26), as indicated at block 70. The selected devices are displayed in a predetermined order on a display (such as the display 28), as indicated at block 72. A proposed static IP address for a first device in the predetermined order of the selected devices is received from the user interface, as indicated at block 74. In some cases, receiving from the user interface the proposed static IP address for the first device further comprises soliciting from a user via the user interface a Subnet mask and/or default gateway for the first device. A static IP address is sequentially assigned to each of the selected devices following the first device in accordance with the predetermined order, as indicated at block 76. In some cases, the same Subnet mask and default gateway are assigned to each of the selected devices. The selected devices are displayed on the display in the predetermined order along with the assigned static IP addresses for each of the selected devices, as indicated at block 78.

In some cases, each of the assigned static IP addresses are confirmed as being valid before downloading the assigned static IP address to the corresponding one of the selected devices. In some cases, the subnet mask is confirmed as being valid even before any of the static IP addresses are sequentially assigned to the devices. Any of the assigned static IP addresses that are found not to be valid may be corrected. In some cases, correcting the invalid static IP addresses may include soliciting a correction from a user via the user interface. In some cases, correcting the invalid static IP addresses may include discarding the assigned static IP address for a particular device when the assigned static IP address for that particular device is determined to not be valid.

The assigned static IP address for each of the selected devices are downloaded to the corresponding one of the selected devices, as indicated at block 80. At least some of the selected devices may have an offline status, meaning that the corresponding selected device is not connected to or otherwise available on the building control network. At least some of the selected devices may have an online status, meaning that the corresponding selected device is powered on and available on the building control network. For devices that are offline, downloading the assigned static IP address for each of the selected devices to the corresponding one of the selected devices may be done after the corresponding selected device is placed online.

In some cases, displaying on the display the selected devices in the predetermined order along with the assigned static IP addresses for each of the selected devices may further include displaying an online/offline status for each of the selected devices. In some instances, displaying on the display the assigned static IP addresses for each of the selected devices may further include displaying a Subnet mask and a default gateway for each of the selected devices.

Figure 6:
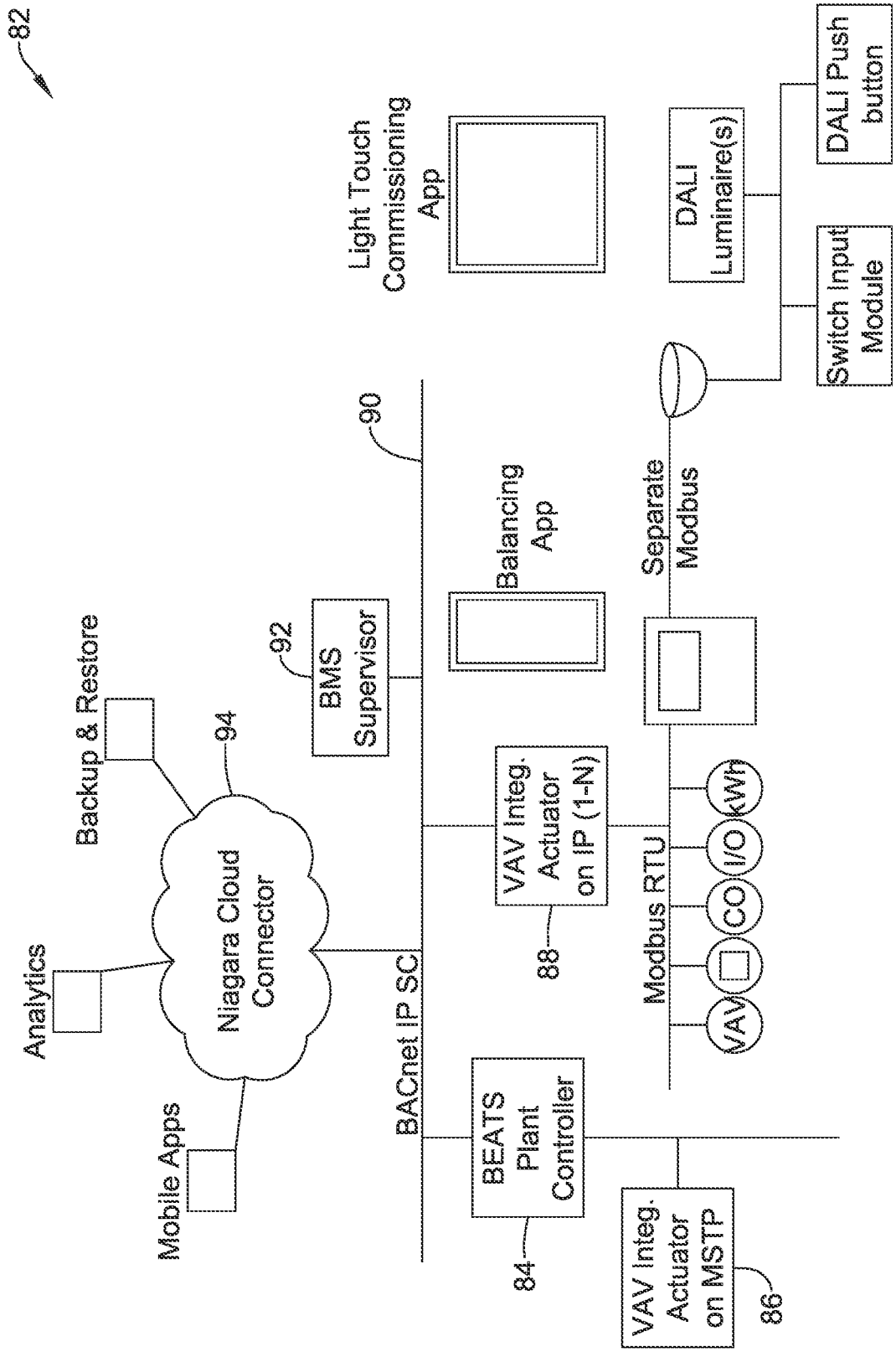
FIG. 6 is a schematic block diagram of another illustrative building control network.

FIG. 6 is a schematic view of an illustrative building control network 82 that may be considered as being an example of the building control network 10 shown in FIG. 1. The building control network 82 includes a controller 84 and VAV (variable air volume) actuators 86 and 88. The controller 84 and the VAV actuators 86 and 88 are operably coupled with a network 90. It will be appreciated that a BMS supervisor 92, which may be considered as similar to the computing device 16, is also operably coupled to the network 90. A cloud-based server 94, which includes a variety of analytics and other functionality, is also operably coupled to the network 90. Accordingly, the BMS supervisor 92 is able to communicate with the cloud-based server 94 as well as being able to communicate with the controller 84 and the VAV actuators 86 and 88.

Figure 7:
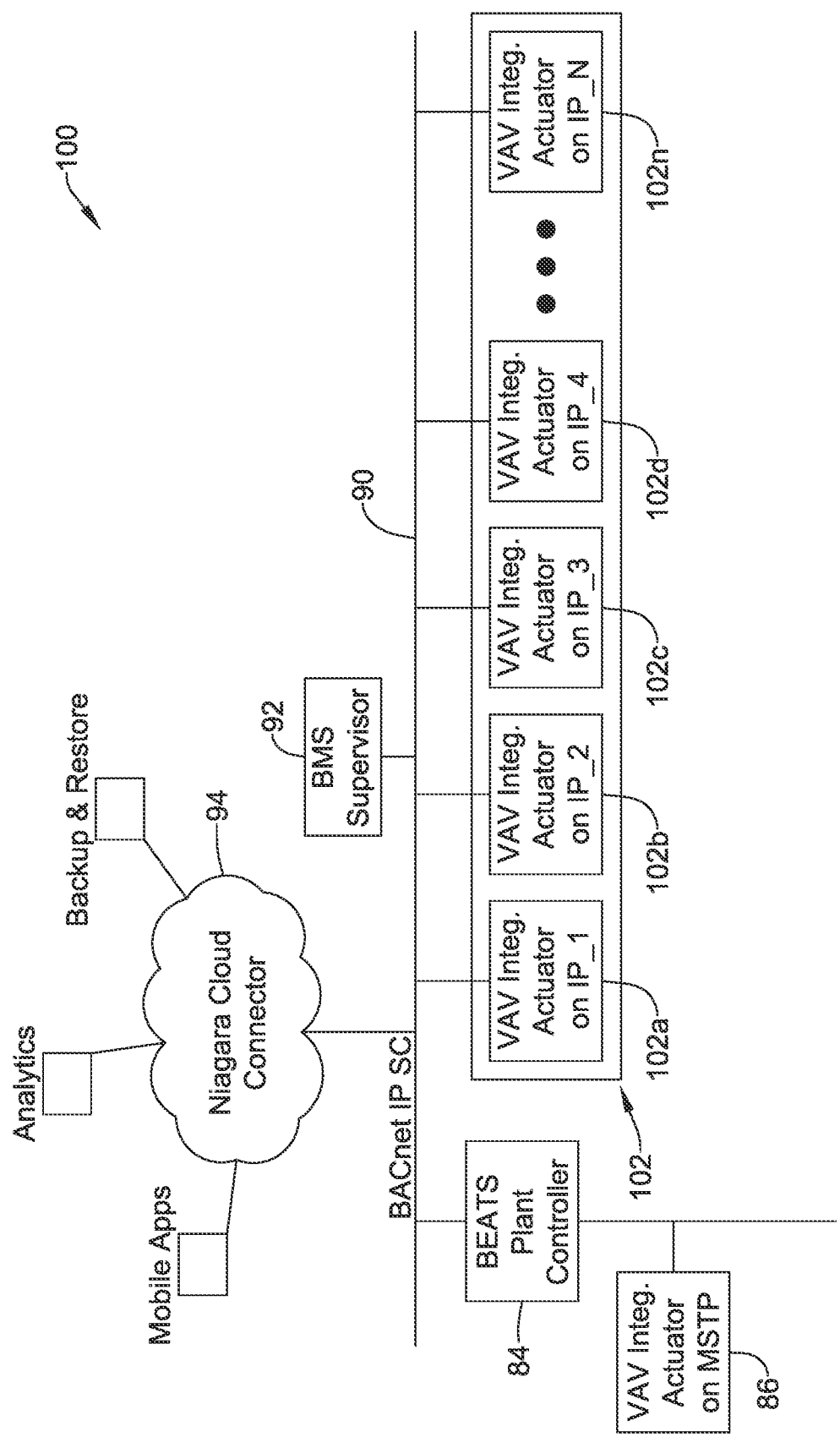
FIG. 7 is a schematic block diagram of another illustrative building control network.

FIG. 7 schematic view of an illustrative building control network 100 that may be considered as being an example of the building control network 10 shown in FIG. 1. The building control network 100 includes the controller 84 and the VAV (variable air volume) actuator 86. The building control network 100 also includes a number of VAV actuators 102, individually labeled as 102, 102b, 102c, 102d and through 102n. The controller 84, the VAV actuator 86 and the VAV actuators 102 are each coupled with the network 90. Accordingly, the BMS supervisor 92 is able to communicate with the cloud-based server 94 as well as being able to communicate with the controller 84 and the VAV actuators 86 and 102.

Figure 8:
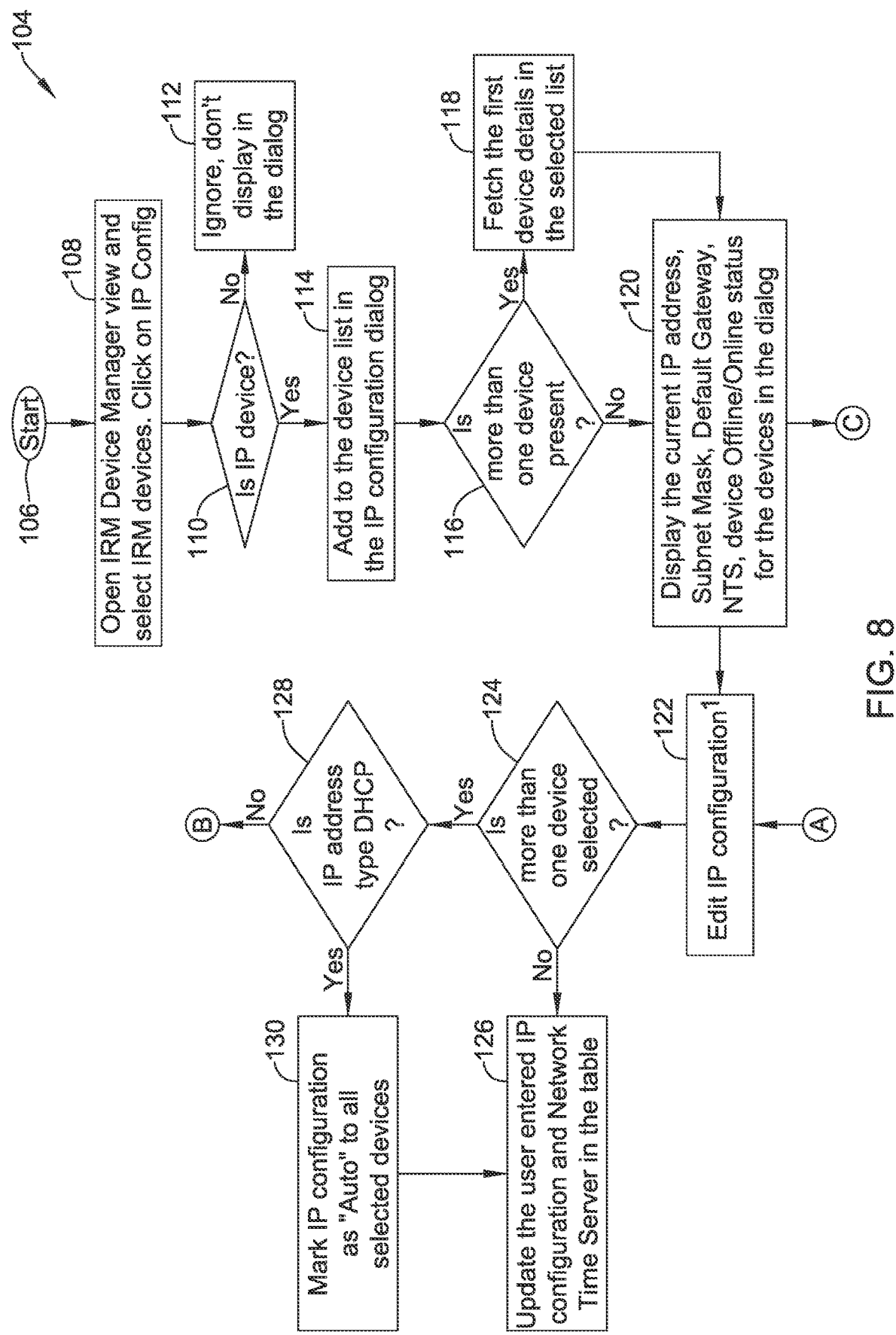
FIGS. 8 and 9 together provide a flow diagram showing an illustrative method of batch assignment of IP addresses to devices of a building control network.
Figure 9:
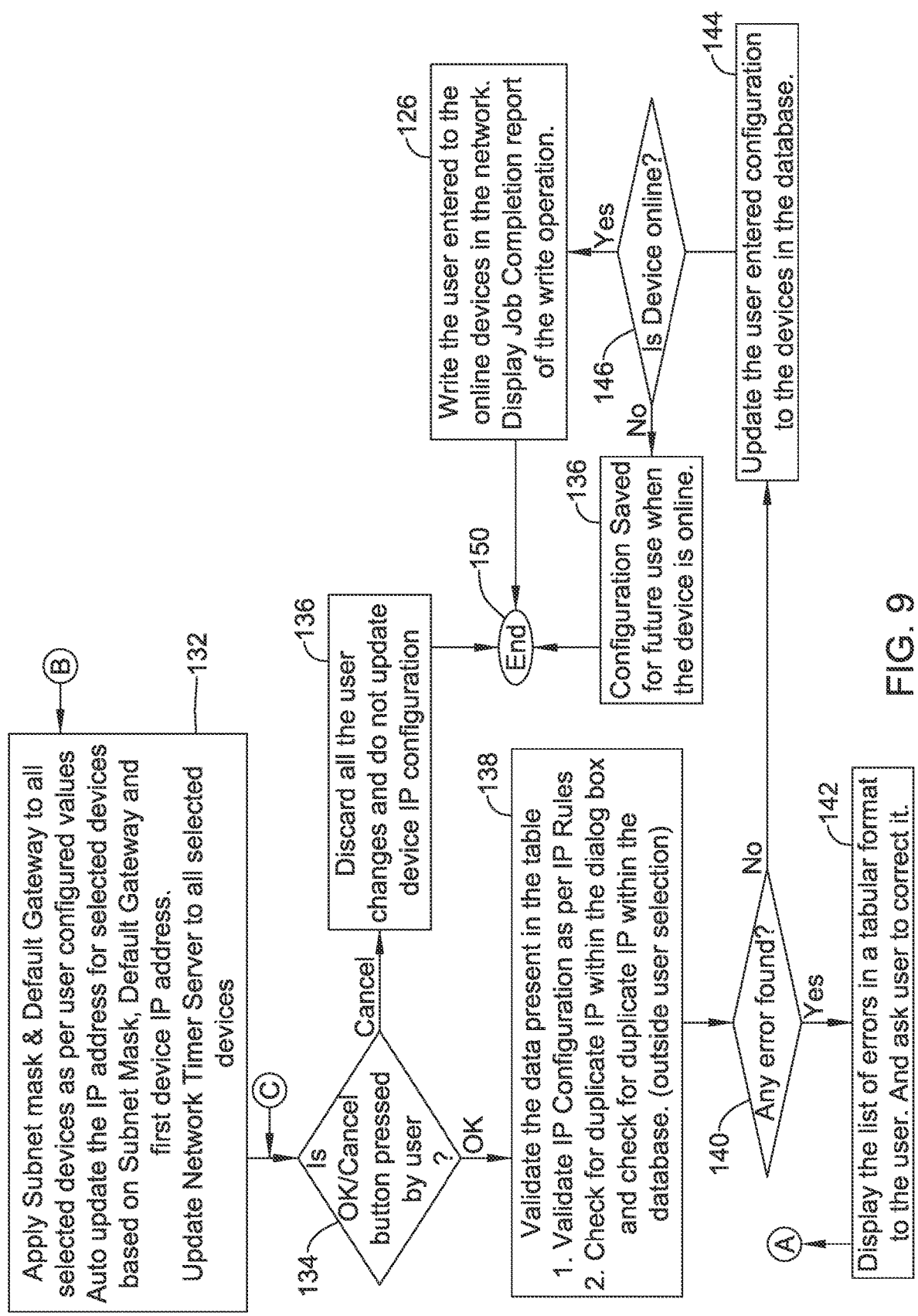

FIGS. 8 and 9 together provide a flow diagram showing an illustrative method 104 of batch assignment of IP addresses to devices of a building control network such as the building control network 10, the building control network 82 or the building control network 100. Control begins at start block 106. At block 108, devices may be selected by a user. The screen shot provided in FIG. 13, to be discussed, provides an example of this. At decision block 110, a determination is made as to whether a particular device is an IP device or not. If not, control passes to block 112 and the particular device is ignored and won't be displayed. However, if the particular device is an IP device, control passes to block 114 and the device is added to the device list.

Figure 14:
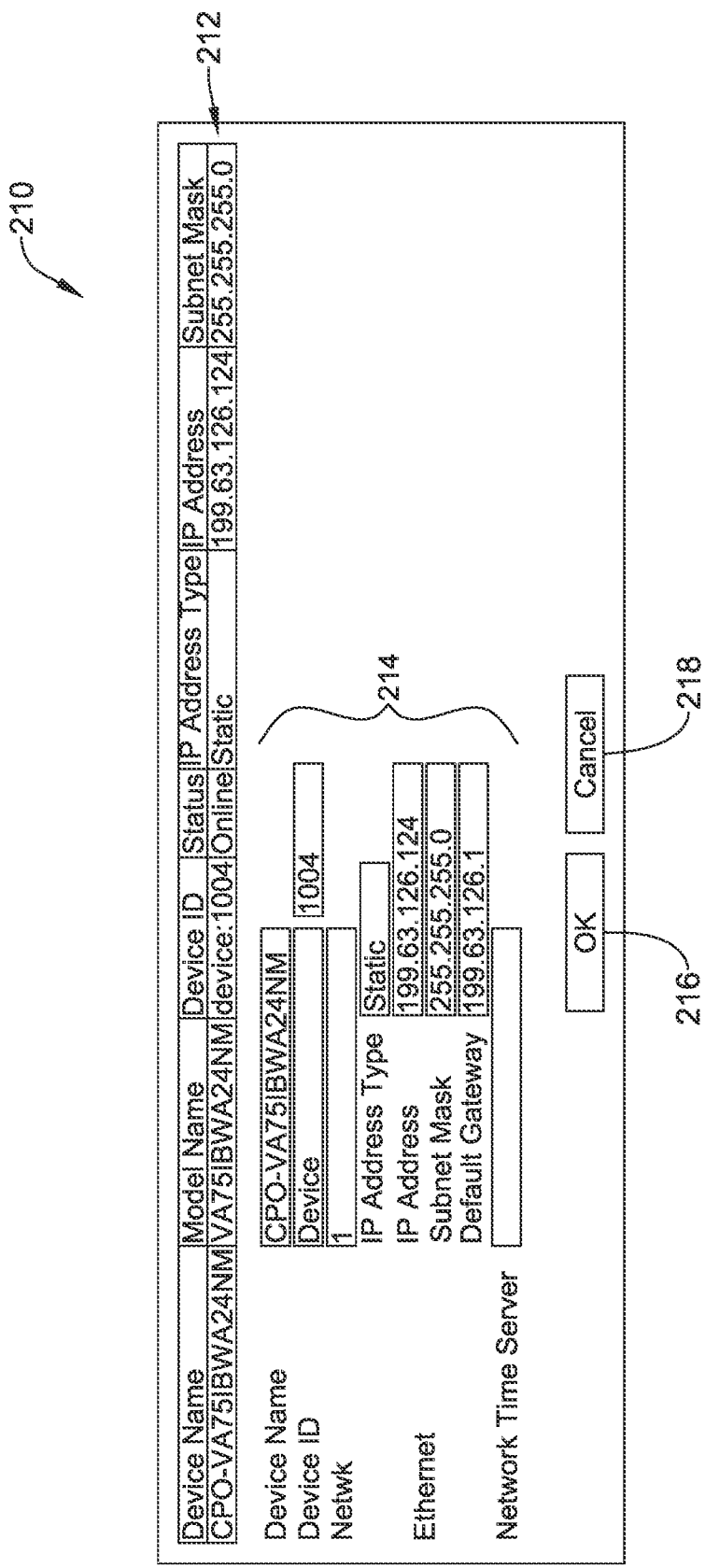
Figure 15:
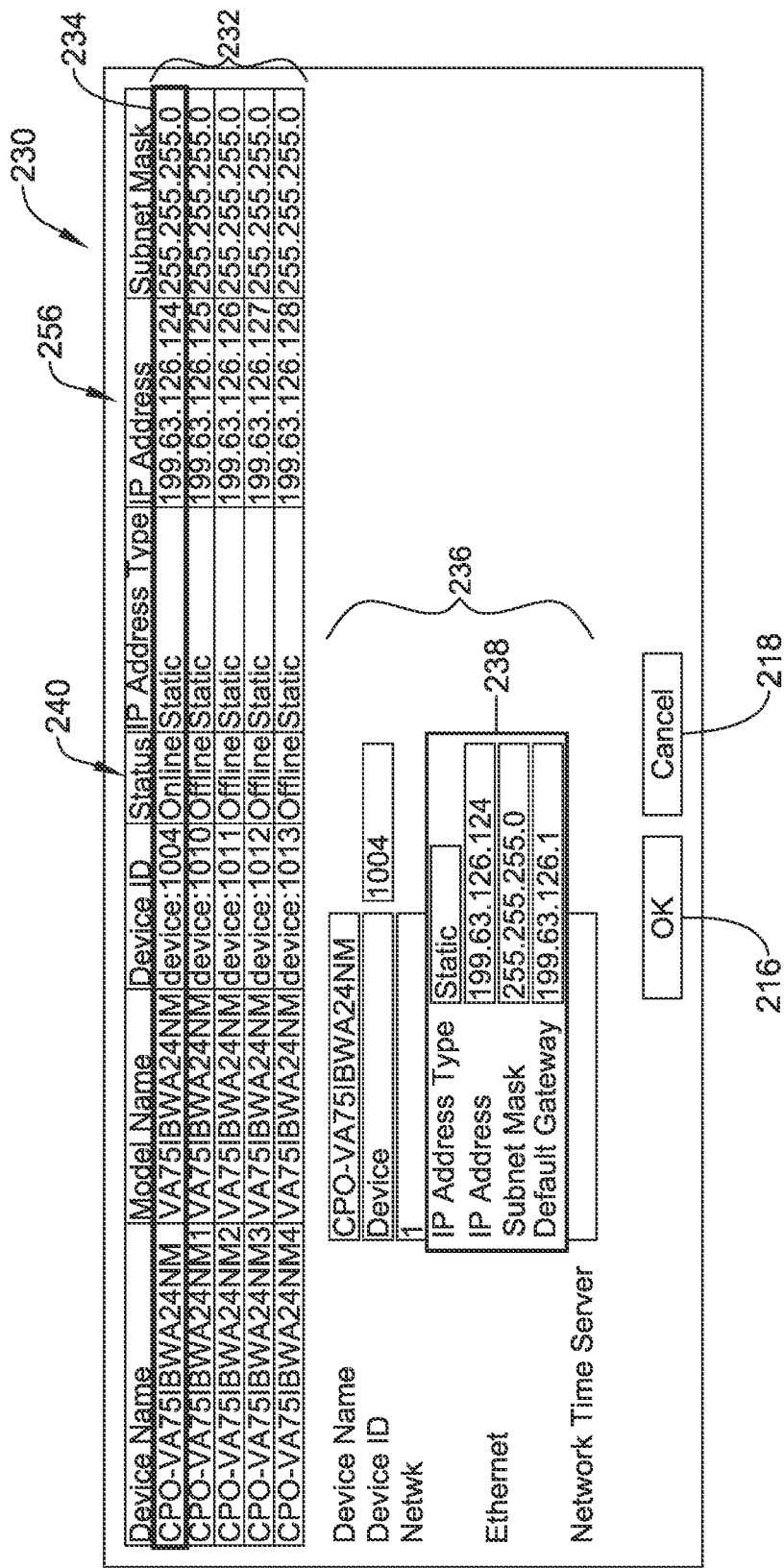

At decision block 116, a determination is made as to whether there is more than one device present. If so, control passes to block 118 and details for the first device are fetched. FIG. 14, to be discussed, provides an example of some of the device details that are fetched. Control then passes to block 120, where a variety of details for each of the devices are displayed. FIG. 15, to be discussed, provides an example of this. Alternatively, if at decision block 116 a determination is made that there is only one device, control passes directly to block 120. From block 120, control then passes to block 122, where the IP configuration may be edited and may also pass to connection block "C".

From block 122, control passes to decision block 124, where a determination is made as to whether there is more than one device selected by the user. If not, control passes to block 126, where user entered information for the single device is updated. FIG. 15, to be discussed, provides an example of this. However, if there is more than one device selected, control passes to a decision block 128, where a determination is made as to whether the IP address is a DHCP type. If yes, control passes to block 130, where the IP configuration type is marked as "auto". If not, control passes to connection block "B".

Figure 16:
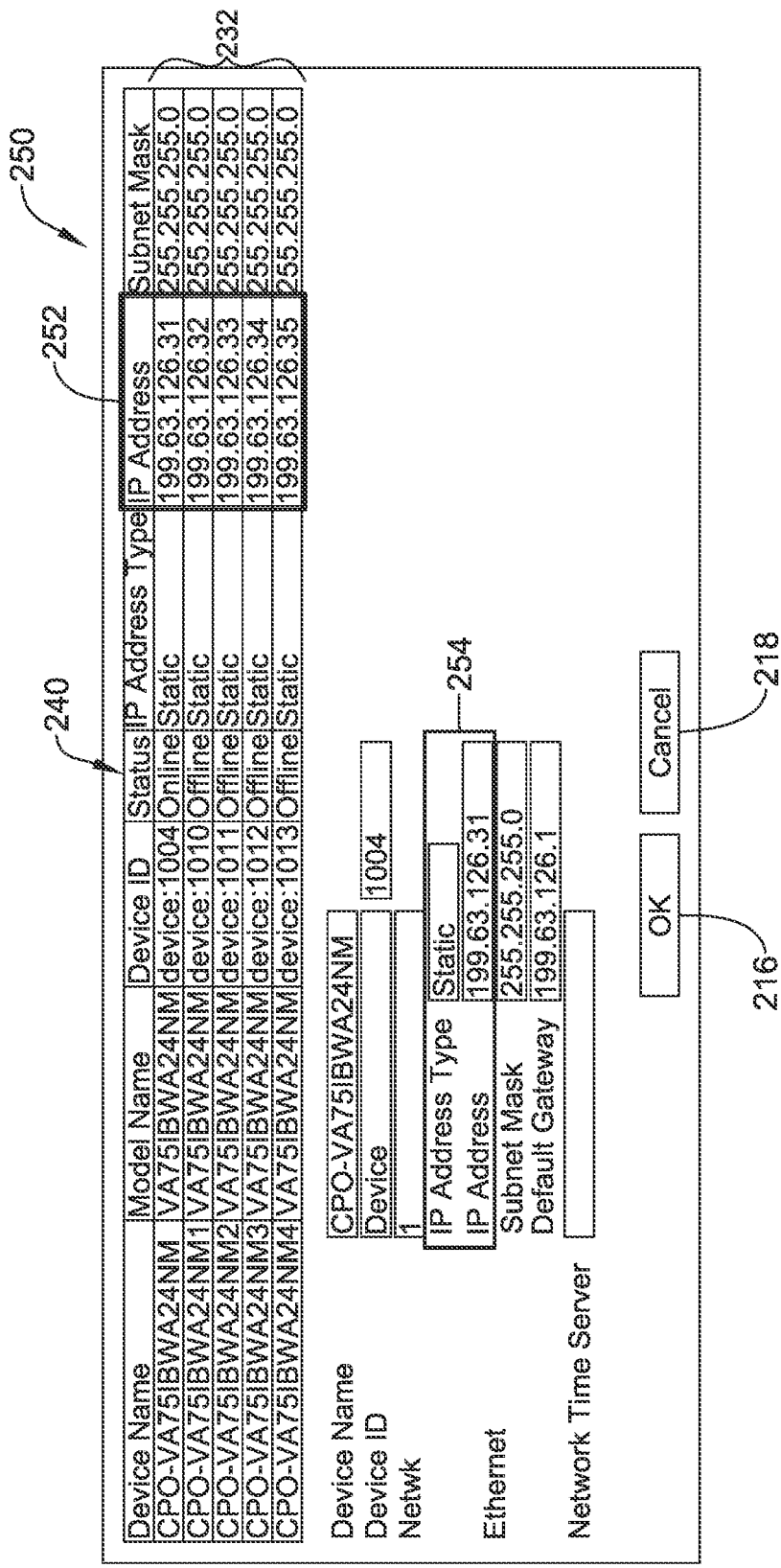
Figure 17:
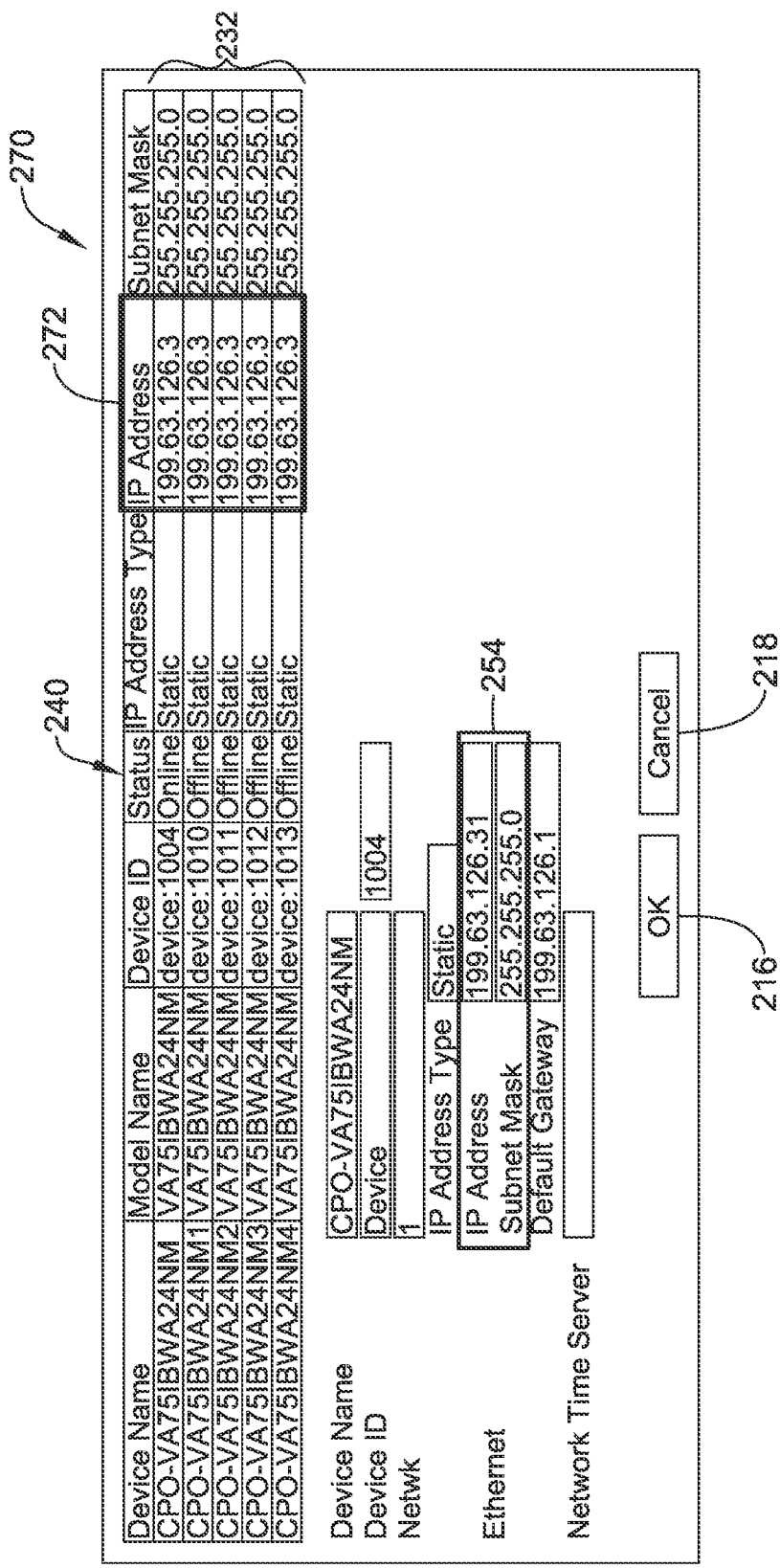

FIG. 9 shows a continuation of the method 104 from the connection block "B" of FIG. 8. From the connection block "B", it has been determined that more than one device has been selected, and the IP address is not of type DHCP. Control passes to block 132 where subnet mask and default gateway is applied to all selected devices. Also, IP addresses are automatically sequentially generated and updated. Also, a network timer server may be updated. FIGS. 16 and 17, to be discussed, provide examples of this. Control passes to a decision block 134, and logical flow from the connection block "C" also passes to the decision block 134. At the decision block 134, a determination is made as to whether the OK or Cancel button has been pressed by the user. If the user has selected the Cancel button, control passes to block 136 where all of the user changes are discarded. Control then passes to end block 150. However, if the user has selected the OK button, control passes to block 138, where the data is validated. This includes checking per a set of IP Configuration Validation Rules (examples given below) and checking for duplicate IP addresses on the building control network.

Example IP Configuration Validation Rules

All Octet cannot be 0 for IP Address, Subnet Mask, Default Gateway.

First Octet cannot start with 0 for IP Address, Subnet Mask, Default Gateway.

The address should be in proper format and the value of Octet should be between 0 to 255 for IP Address, Subnet Mask, Default Gateway.

IP Address and Default Gateway should not be the same.

All the bits in the host address portion of the IP address cannot be 0.

All the bits in the host address portion of the IP address cannot be 1.

The default gateway is not on the same network segment defined by the IP address and subnet mask.

Invalid subnet mask, the subnet mask must be contiguous.

All the bits in the network address portion of the IP address cannot be 0.

IP Address is not unique. (IP Address validation within the network).

The first octet of IP Addresses should be between 1 and 223. (Class D IP address not accepted).

The first octet of the default gateway should be between 1 and 223. (Class D IP address not accepted).

Figure 23:
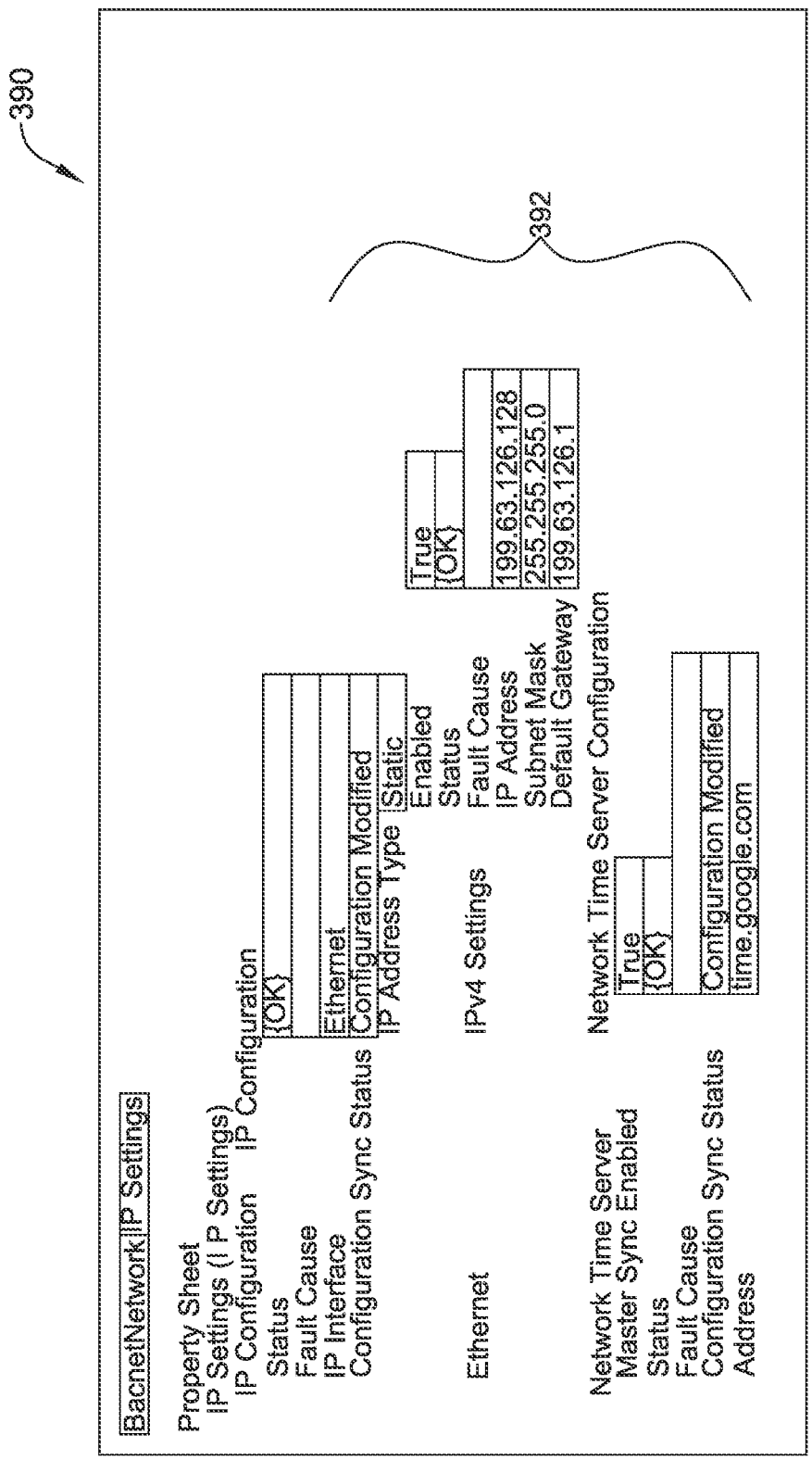

Control passes to decision block 140, where a determination is made as to whether any errors in the IP addresses were found. If so, control passes to block 142, where the errors are listed. FIG. 21, to be discussed, provides an example of this. Control then reverts to connection block "A". However, if no errors were found, control passes to block 144 and the user entered information is updated. FIG. 23, to be discussed, provides an example of updated information for a particular device. Control passes to decision block 146, where a determination is made as to whether the device is online. If not, control passes to block 148 where the configuration is saved until such time as the device is online and the configuration can be downloaded to the device. Control then passes to end block 150. However, if the device is online, control passes to block 152 and the configuration is downloaded to the device. FIGS. 24 and 25, to be discussed, provide examples of this.

Figure 10:
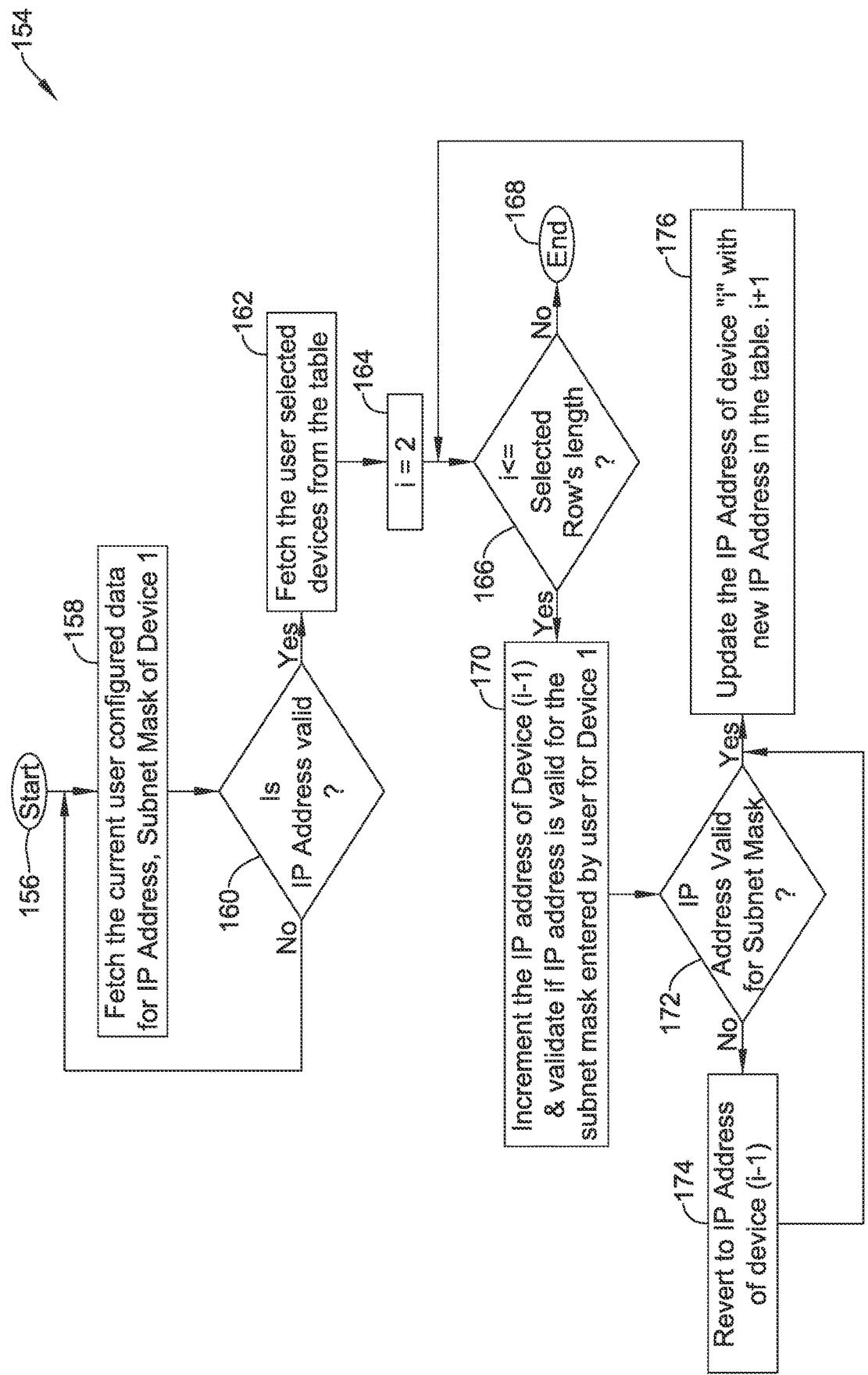
FIG. 10 is a flow diagram showing an illustrative method of automatically updating IP addresses for devices of a building control network.

FIG. 10 is a flow diagram showing an illustrative method of automatically updating IP addresses for devices of a building control network such as the building control network 10, the building control network 82 or the building control network 100. Control begins at a start block 156. At block 158, the user configured data for a first device is retrieved. At decision block 160, a determination is made as to whether the IP address is valid. If not, control reverts to block 158. However, if the IP address is valid, control passes to block 162 where the user-selected devices are retrieved.

At block 164, a counter "i" is set equal to 2. At decision block 166, a determination is made as to whether a current value of "i" is less than or equal to a selected row's length. The row length corresponds to the number of devices that the IP address is to be automatically updated (e.g. number of devices selected by the user, i.e. selected devices). If not, control passes to end block 168. Otherwise, control passes to block 170 where the IP address for device "i" is incremented and then validated. FIG. 16, to be discussed, provides an example of this.

Control passes to decision block 172, where a determination is made as to whether the IP address is valid for the subnet mask. If not, control passes to block 174 and the IP address reverts to the IP address of the previous device. FIG. 17, to be discussed, provides an example of this. However, if the IP address is valid for the subnet mask, control passes to block 176 where the IP address is updated and the counter "i" is incremented. Control then reverts to decision block 166.

Figure 11:
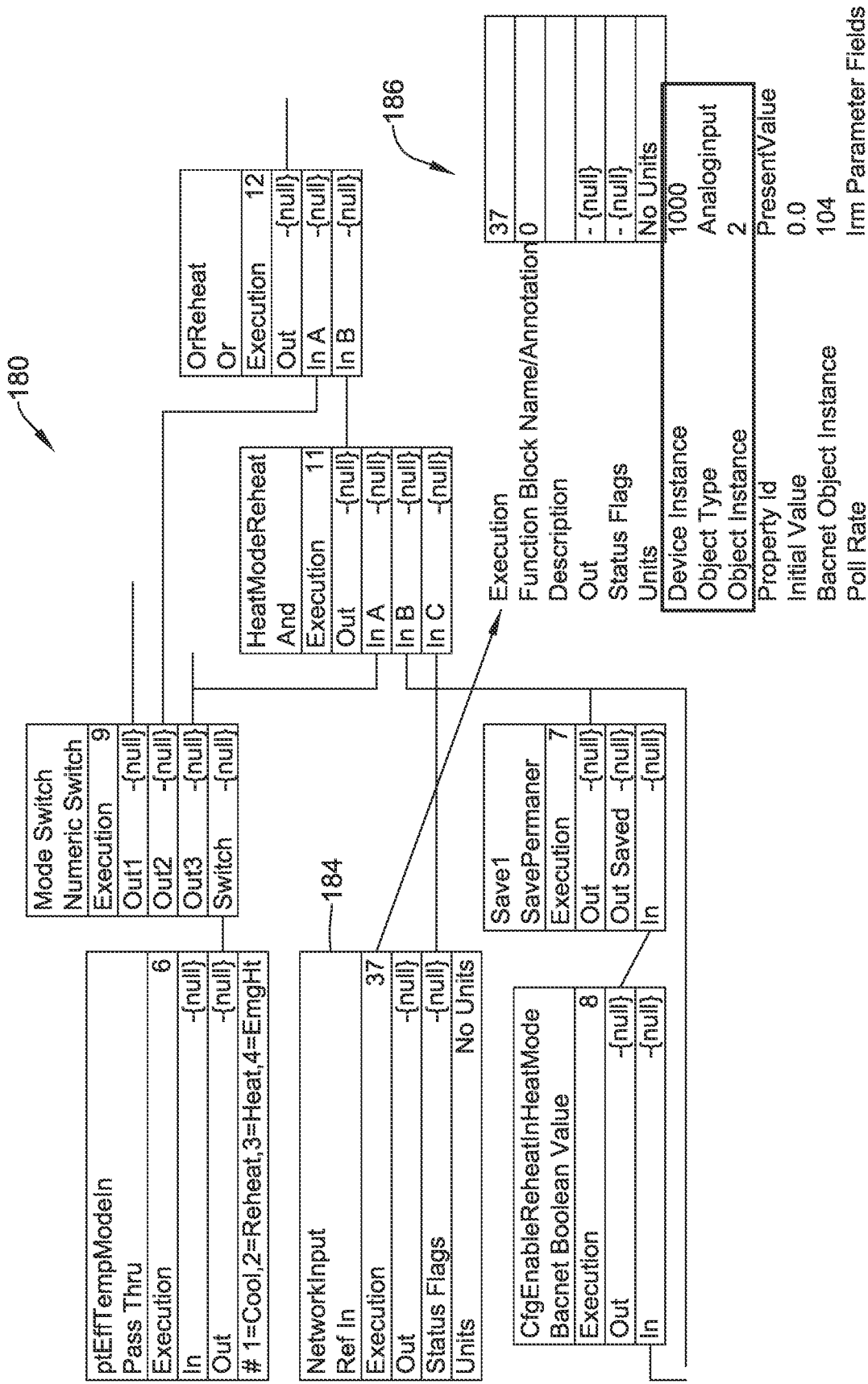
FIG. 11 is a schematic diagram showing an illustrative wire frame used for programming the interaction of selected building control devices of a building control network.
Figure 12:
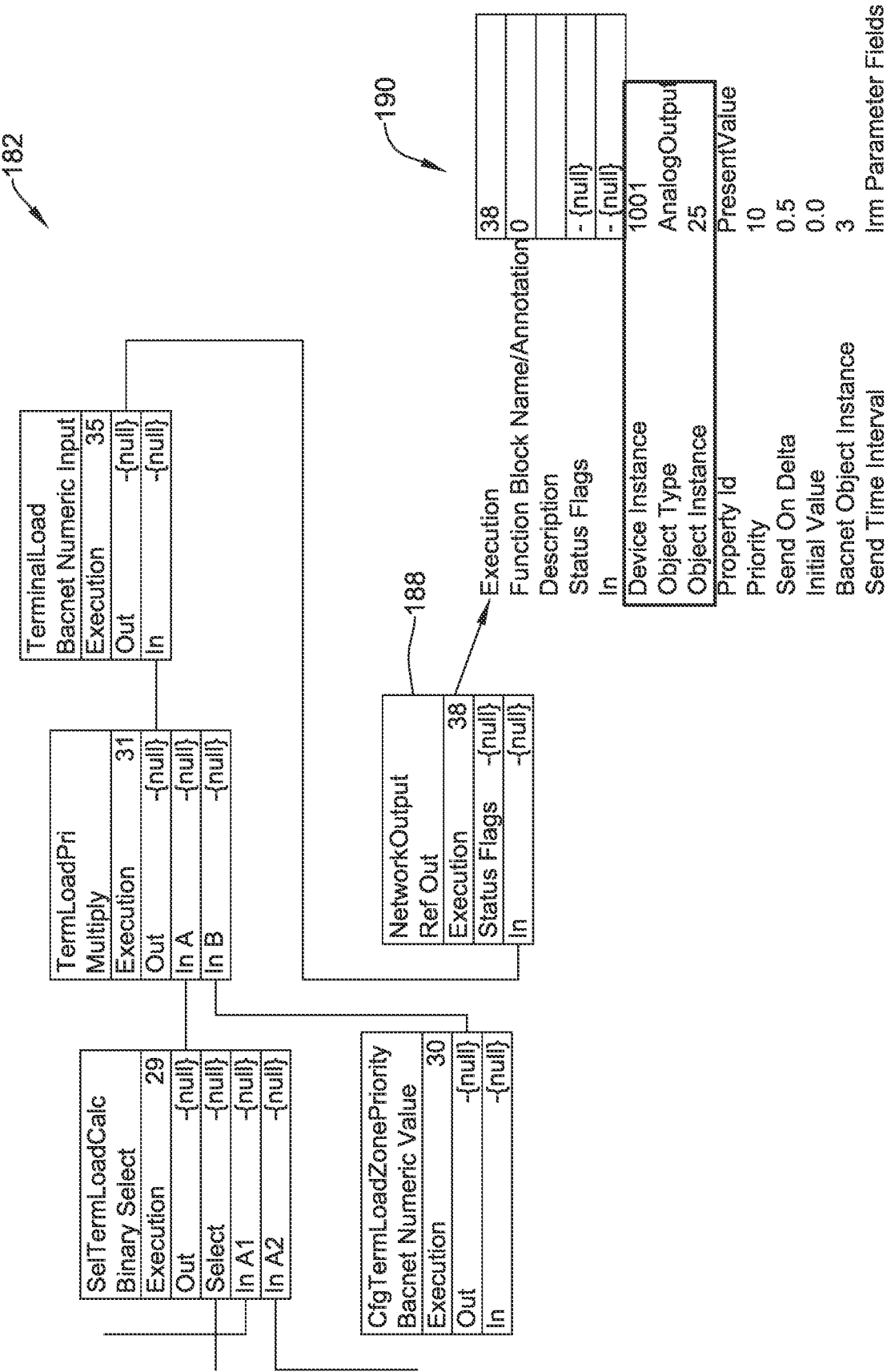
FIG. 12 is a schematic diagram showing another illustrative wire frame used for programming the interaction of selected building control devices of a building control network.

FIGS. 11 and 12 show wire frames that may be used for programming the interaction of building control devices of a building control network. The wireframes define the logic that may be downloaded to the various building controllers of the building control network. As seen in FIG. 11, via a Network Input block 184, a value is coming into the corresponding device using a reference input object. Details for the Network Input block 184 are shown in a listing 186, and include details that this is device instance 1000, the object type is analog input and the object instance # is 2. As seen in FIG. 12, via a Network Output block 188, a value is being sent to another device. Details for the Network Output block 188 are shown in a listing 190, and include details that this is device instance 1001, the object type is analog output and the object instance # is 25.

FIGS. 13 through 26 provide illustrative screen shots. FIG. 14 is a screen shot 200 of an illustrative device manager view. The screen shot 200 includes a table 202 that includes information pertaining to a variety of parameters for each of the devices. Selecting the IP Config button 204, as seen near the bottom of the screen shot 200 will populate all of the selected IP devices in the database.

FIG. 14 provides a screen shot 210 that shows an example of an IP configuration dialog if there is only one device selected. The screen shot 210 includes a table 212 having a single row corresponding to the single device as well as a section 214 that lists a number of parameters for that device, including device name and ID, network identification, IP address type, IP address, subnet mask and default gateway. The screen shot 210 includes an OK button 216 and a Cancel button 218. Use of the OK button 216 and the Cancel button 218 were referenced with respect to FIGS. 8 and 9.

FIG. 15 provides a screen shot 230 that shows an example of an IP configuration dialog with multiple devices. The screen shot 230 includes a table 232 having a plurality of rows, one row for each of the multiple devices, as well as a section 236 that lists a number of parameters for a selected device 234, including device name and ID, network identification, IP address type, IP address, subnet mask and default gateway. A portion 238 shows the user-editable fields that will be automatically populated but can be edited if appropriate. A section 240 indicates the online/offline status of each of the devices. Use of the OK button 216 and the Cancel button 218 were referenced with respect to FIGS. 8 and 9.

FIG. 16 provides a screen shot 250 that shows successfully auto updating the IP addresses for five (5) selected devices. The table 232 includes a listing 252 of updated IP addresses as well as the entered IP address 254 for the first device (top device in the listing 252) in the listing 252 of selected devices. As long as the subnet mask is valid, the tool will sequentially update the other IP addresses based on the user-entered value for the first device. By comparing the listing 252 to a corresponding listing 256 shown in FIG. 15, it can be seen that the IP address for each device has successfully updated. The section 240 indicates the online/offline status of each of the devices. Use of the OK button 216 and the Cancel button 218 were referenced with respect to FIGS. 8 and 9.

FIG. 17 provides a screen shot 270 that shows a failure in auto updating the IP addresses. A listing 272 of IP addresses, relative to that 254 of the first device, shows that the IP addresses failed to update. In this particular case, the tool determined that the subnet mask was not valid and thus did not auto update the IP addresses. The section 240 indicates the online/offline status of each of the devices. Use of the OK button 216 and the Cancel button 218 were referenced with respect to FIGS. 8 and 9.

Figure 18:
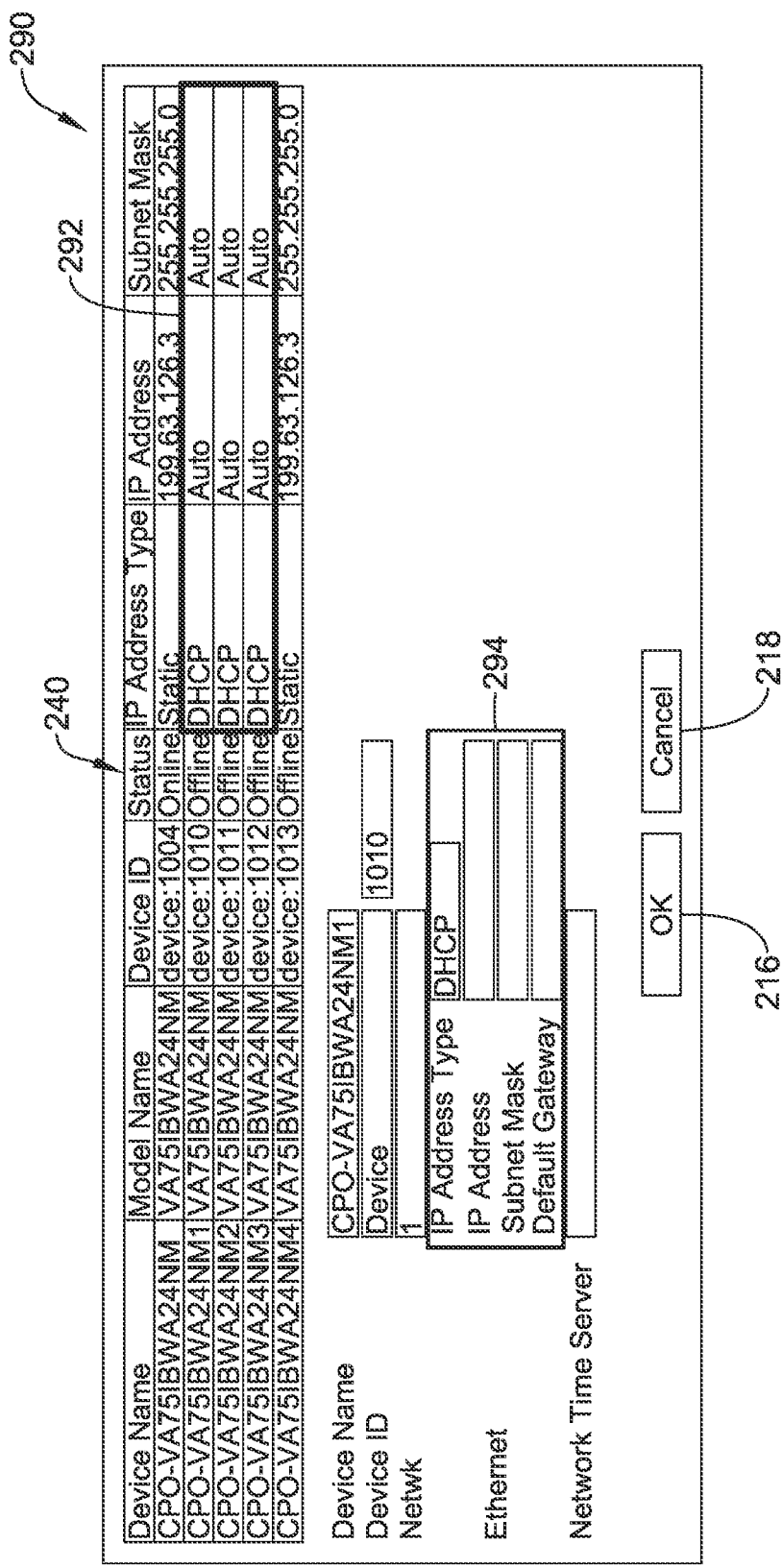

FIG. 18 provides a screen shot 290 that shows DHCP configuration from the IP configuration dialog. DHCP, or Dynamic Host Configuration Protocol, is a network management protocol. The screen shot 290 includes a section 292 showing IP address type, IP address, subnet mask and default gateway. A section 294 shows that the IP address, subnet mask and default gateway have not been provided. The tool allows the user to select a set of devices and update the IP address type to DHCP or Static. When the IP address type is set to DHCP, the IP addresses are automatically generated by the DHCP service. The section 240 indicates the online/offline status of each of the devices. Use of the OK button 216 and the Cancel button 218 were referenced with respect to FIGS. 8 and 9.

Figure 19:
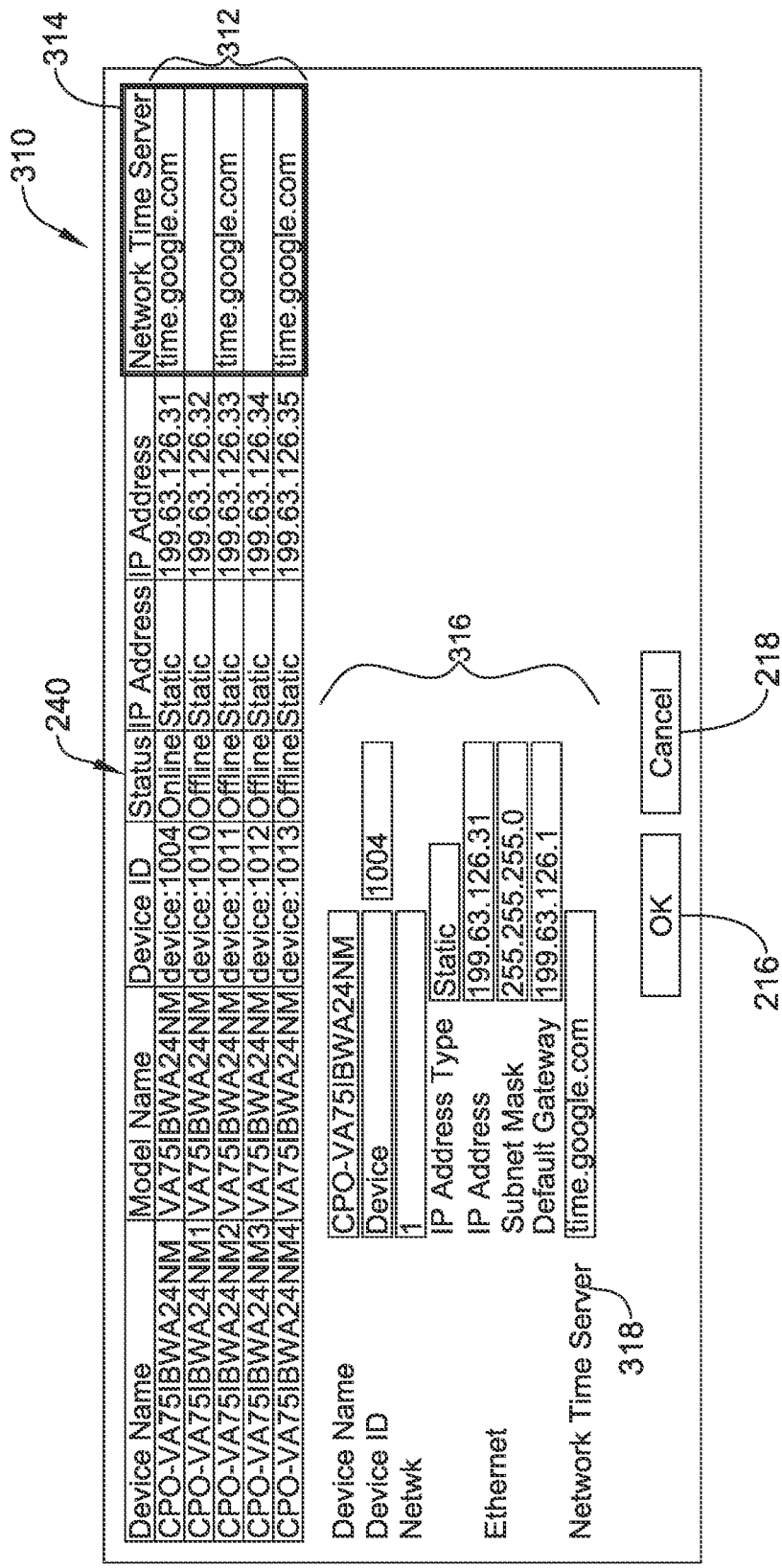

FIG. 19 provides a screen shot 310 that shows configuring the network time server from the IP configuration dialog. The screen shot 310 includes a table 312 showing each of the devices. The table 312 includes a section 314 showing the assigned network time server for each of the devices, as entered in the IP configuration dialog section 316 in general and as the Network Time Server 318 in particular. This allows the user to configure the network time server for selected devices while updating the IP configuration itself, thereby saving additional clicks. The section 240 indicates the online/offline status of each of the devices. Use of the OK button 216 and the Cancel button 218 were referenced with respect to FIGS. 8 and 9.

Figure 20:
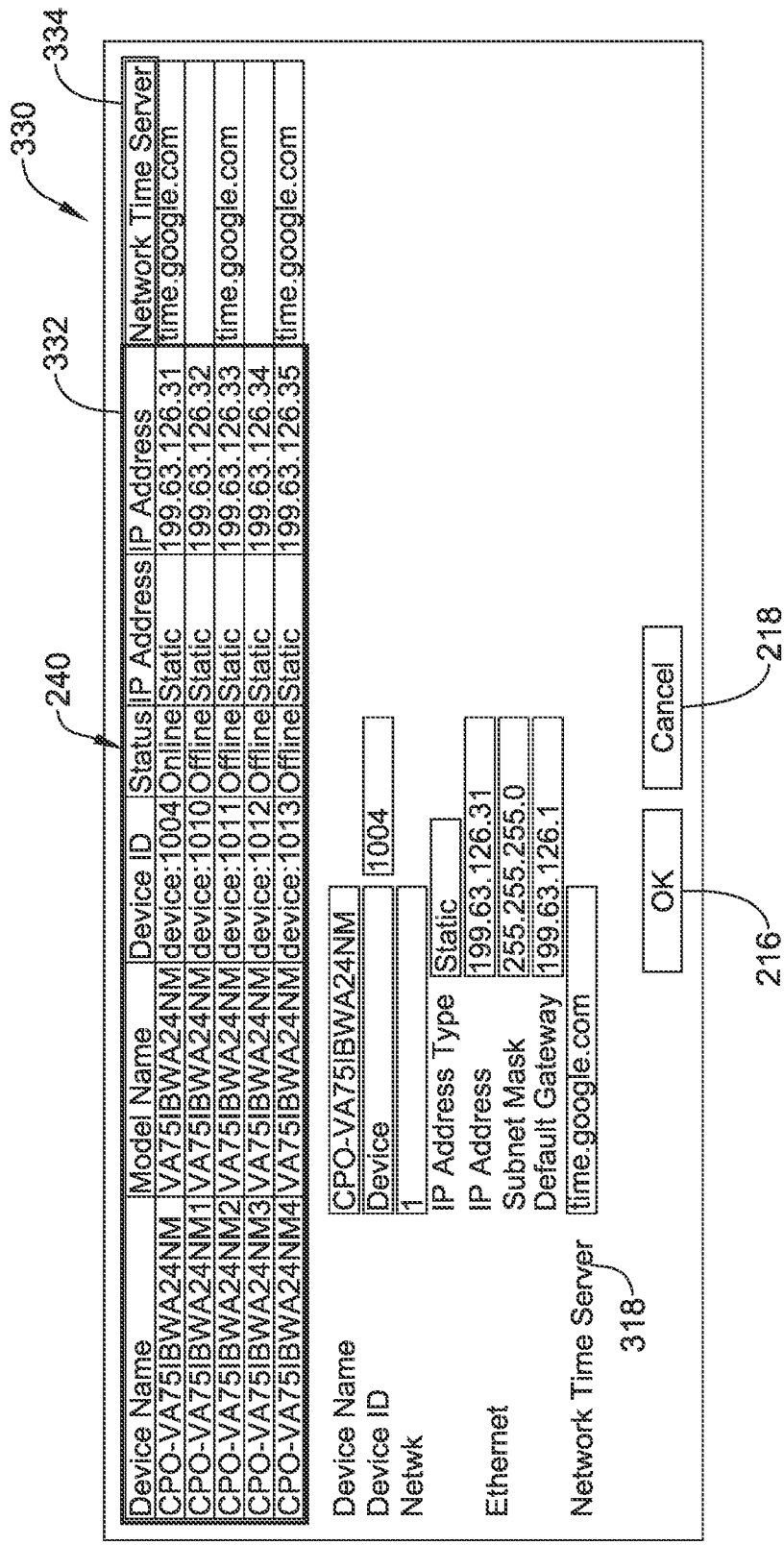

FIG. 20 provides a screen shot 330 that shows the ability for the user to sort the listed devices according to any of the columns shown. In this particular example, the user has selected the Network Time Server column 334, and thus the devices shown in box 332 have been sorted accordingly. The user could sort by any other column as well. This can be particularly useful if the user is working with a group of devices. For example, the user could sort by the online/offline status as shown in the section 240, which indicates the online/offline status of each of the devices. Use of the OK button 216 and the Cancel button 218 were referenced with respect to FIGS. 8 and 9.

FIG. 21 provides a screen shot 350 that includes a pop-up box 352 that lists detected errors that were found during IP configuration validation that need to be fixed. FIG. 22 provides a screen shot 370 that includes a pop-up box 372 that lists detected errors that were found via duplicate IP address validation.

FIG. 23 provides a screen shot 390 that includes a listing of IP configuration settings 392 for a particular device. In some cases, an alternate IP configuration may be provided at the device level that will be updated based on the details entered while the device is offline or online. This enables offline programming of IP assignment. The user also has an option to directly update the IP configuration in this screen for the displayed device.

FIG. 24 provides a screen shot 410 showing a job log that may be displayed showing success only notification for one online controller. Section 412 shows success for the IRM batch operation as well as job success. In contrast, FIG. 25 provides a screen shot 430 showing a job log that may be displayed showing failure notices with one online controller and one offline controller. The screen shot 430 shows a section 432 with multiple failure notifications.

FIG. 26 provides a screen shot 450 that shows discovery of online versus offline devices. A section 452 shows a discovered device, which corresponds to a particular device 454 as listed in the database. The discovered device was discovered because it was online. A section 456 shows devices that are listed in the database but were not discovered because they were offline. The devices listed in the section 456 correspond to offline devices that were added by the user based on the site configuration data. This can be a substantial time saver, as all of the configuration including IP configuration can be completed away from the site. Once the user is at the site, the user simply has to commission the devices by downloading the configurations.

Those skilled in the art will recognize that the present disclosure may be manifested in a variety of forms other than the specific embodiments described and contemplated herein. Accordingly, departure in form and detail may be made without departing from the scope and spirit of the present disclosure as described in the appended claims.

What is claimed is:

1. A method of assigning IP addresses to devices of a building control network, the method comprising:
   before the building control network is physically installed on-site:
   defining the building control network including identifying each of a plurality of devices that are to be part of the building control network;
   receiving from a user interface a selection of selected devices of the plurality of devices;
   receiving from the user interface an input that sets a predetermined order for the selected devices;
   after setting the predetermined order:

displaying the selected devices in the predetermined order on a display;

receiving from the user interface a first static IP address for a first device in the predetermined order of the selected devices;

assigning the first static IP address to the first device;

automatically assigning consecutive static IP addresses to the selected devices following the first device in accordance with the predetermined order, wherein the consecutive static IP addresses follow one after another in order without interruption;

displaying, on the display, the selected devices in the predetermined order along with the assigned static IP address for each of the selected devices;

validating each of the assigned static IP addresses, wherein the validating includes:

checking each of the assigned static IP addresses for duplication on the building control network and determining that the respective static IP address fails validation when a duplicate IP address is found; and checking each of the assigned static IP addresses against a plurality of predefined IP configuration validation rules and determining that the respective assigned static IP address fails validation when one or more of the plurality of predefined IP configuration rules is violated;

after the building control network is physically installed on-site:

placing each of the selected devices on-line on the building control network; and downloading the assigned static IP address for each of the selected devices to the corresponding one of the selected devices.

2. The method of claim 1, wherein at least some of the selected devices are initially offline, and downloading the assigned static IP address for each of the selected devices that is initially offline is performed after the corresponding one of the selected devices is placed online.

3. The method of claim 2, wherein displaying on the display the selected devices in the predetermined order along with the assigned static IP address for each of the selected devices further comprises displaying an online/offline status for each of the selected devices.

4. The method of claim 3, wherein the selected devices have an online status when powered on and available on the building control network, and wherein the selected devices have an offline status when not connected to or otherwise not available on the building control network.

5. The method of claim 1, further comprising:

applying one or more filters to devices of the building control network, wherein the one or more filters remove one or more of the devices of the building control network that do not meet one or more filter criteria, resulting in the plurality of devices from which the selection of selected devices is made.

6. The method of claim 1, wherein the input received from the user interface that sets the predetermined order includes one or more sorting criteria, and wherein the method further comprises sorting the selected devices in accordance with the one or more sorting criteria prior to setting the predetermined order for the selected devices.

7. The method of claim 6, wherein the one or more sorting criteria include one or more device parameters, wherein the one or more device parameters include one or more of a device type, a device status, a default gateway, a subnet mask, and network time server.

8. The method of claim 1, wherein receiving from the user interface the first static IP address for the first device further comprises soliciting from a user via the user interface a Subnet mask and/or default gateway for the first device.

9. The method of claim 1, further comprising soliciting user input to correct the assigned static IP address for a particular device when the assigned static IP address for the particular device fails validation.

10. The method of claim 1, wherein displaying on the display the assigned static IP addresses for each of the selected devices further comprises displaying a Subnet mask and a default gateway for each of the selected devices.

11. A system for assigning static IP addresses to a plurality of devices of a building control network, the system comprising:

a computing device including a controller, wherein:

before the building control network is physically installed on-site, the controller is configured to:

receive from a user interface an input that defines the building control network including identifying each of a plurality of devices that are to be part of the building control network;

receive from the user interface an input that sets a predetermined order for the plurality of devices;

wherein after setting the predetermined order, the computing device is configured to:

display the plurality of devices in the predetermined order on a display;

receive from the user interface a first static IP address for a first device in the predetermined order of the plurality of devices;

assign the first static IP address to the first device;

automatically assign consecutive static IP addresses to the plurality of devices following the first device in accordance with the predetermined order, wherein the consecutive static IP addresses follow one after another in order without interruption;

display, on the display, the plurality of devices in the predetermined order along with the assigned static IP address for each of the plurality of devices;

validate each of the assigned static IP addresses by:

checking each of the assigned static IP addresses for duplication on the building control network and determining that the respective static IP address fails validation when a duplicate IP address is found; and checking each of the assigned static IP addresses against a plurality of predefined IP configuration validation rules and determining that the respective assigned static IP address fails validation when one or more of the plurality of predefined IP configuration rules is violated; and after the building control network is physically installed on-site, the controller is configured to:

download the assigned static IP address for each of the plurality of devices to the corresponding one of the plurality of devices.

12. The system of claim 11, wherein at least some of the plurality of devices are initially offline, and wherein the controller is configured to download the assigned static IP address for each of the at least some of the plurality of devices that is initially offline after the corresponding one of the plurality of devices is placed online.

13. The system of claim 11, wherein the controller is configured to:
apply one or more filters to devices of a building control network, wherein the one or more filters remove one or more of the devices of the building control network that do not meet one or more filter criteria, resulting in the plurality of devices.

14. The system of claim 11, wherein the input received from the user interface that sets the predetermined order includes one or more sorting criteria, and wherein the controller is configured to sort the plurality of devices in accordance with the one or more sorting criteria prior to setting the predetermined order for the plurality of devices.

15. The system of claim 14, wherein the one or more sorting criteria include one or more device parameters, wherein the one or more device parameters include one or more of a device type, a device Offline/Online status, a default gateway, a subnet mask, and network time server.

16. A non-transitory, computer-readable storage medium having stored thereon instructions that when executed by one or more processors, cause the one or more processors to:
before a building control network is physically installed on-site:
receive from a user interface an input that defines the building control network including identifying each of a plurality of devices that are to be part of the building control network;
receive from the user interface a selection of selected devices of the plurality of devices;
receive from the user interface an input that sets a predetermined order for the selected devices;
after setting the predetermined order:
display the selected devices in the predetermined order on a display;
receive from the user interface a first static IP address for a first device in the predetermined order of the selected devices;
assign the first static IP address to the first device;
automatically assign consecutive static IP addresses to the selected devices following the first device in accordance with the predetermined order, wherein the consecutive static IP addresses follow one after another in order without interruption;
display, on the display, the selected devices in the predetermined order along with the assigned static IP address for each of the selected devices;
validate each of the assigned static IP addresses against a plurality of predefined IP configuration validation rules and determining that the respective assigned static IP address fails validation when one or more of the plurality of predefined IP configuration rules is violated; and
after the building control network is physically installed on-site:
download the assigned static IP address for each of the selected devices to the corresponding one of the selected devices.

17. The non-transitory, computer-readable storage medium of claim 16, wherein the instructions, when executed by one or more processors, cause the one or more processors to:
apply one or more filters to the devices of the building control network, wherein the one or more filters remove one or more of the devices of the building control network that do not meet one or more filter criteria, resulting in the plurality of devices from which the selection of selected devices is made.

18. The non-transitory, computer-readable storage medium of claim 16, wherein the input received from the user interface that sets the predetermined order includes one or more sorting criteria, and wherein the instructions that when executed by one or more processors, cause the one or more processors to sort the selected devices in accordance with the one or more sorting criteria prior to setting the predetermined order for the selected devices.

19. The non-transitory, computer-readable storage medium of claim 18, wherein the one or more sorting criteria include one or more device parameters, wherein the one or more device parameters include one or more of a device type, a device status, a default gateway, a subnet mask, and network time server.

* * * * *